United States Patent
Tu et al.

(10) Patent No.: US 12,049,551 B2
(45) Date of Patent: Jul. 30, 2024

(54) COMPOSITE PARTICLES FOR TONER ADDITIVES

(71) Applicant: Cabot Corporation, Boston, MA (US)

(72) Inventors: Hairuo Tu, Boxborough, MA (US); Jincheng Xiong, Boxborough, MA (US); Paul S. Palumbo, West Newton, MA (US); Dmitry Fomitchev, Lexington, MA (US)

(73) Assignee: Cabot Corporation, Boston, MA (US)

( * ) Notice: Subject to any disclaimer, the term of this patent is extended or adjusted under 35 U.S.C. 154(b) by 683 days.

(21) Appl. No.: 17/265,664

(22) PCT Filed: Aug. 6, 2019

(86) PCT No.: PCT/US2019/045225
§ 371 (c)(1),
(2) Date: Feb. 3, 2021

(87) PCT Pub. No.: WO2020/033357
PCT Pub. Date: Feb. 13, 2020

(65) Prior Publication Data
US 2021/0380779 A1 Dec. 9, 2021

Related U.S. Application Data

(60) Provisional application No. 62/868,172, filed on Jun. 28, 2019, provisional application No. 62/858,585, (Continued)

(51) Int. Cl.
*G03G 9/097* (2006.01)
*C08K 3/36* (2006.01)
(Continued)

(52) U.S. Cl.
CPC .................. *C08K 3/36* (2013.01); *C08K 9/06* (2013.01); *C09C 1/3081* (2013.01);
(Continued)

(58) Field of Classification Search
CPC ........... G03G 9/09716; G03G 9/09725; G03G 9/09783
See application file for complete search history.

(56) References Cited

U.S. PATENT DOCUMENTS

| 5,424,129 A | 6/1995 | Lewis et al. |
| 7,566,521 B2 | 7/2009 | Kotsugai et al. |

(Continued)

FOREIGN PATENT DOCUMENTS

| CA | 2125427 A1 | 12/1995 |
| WO | WO 2009/09008 A1 | 1/2009 |

OTHER PUBLICATIONS

The International Search Report and the Written Opinion of the Interntional Searching Authority, or the Declaration, of International Application No. PCT/US2019/045225, mailed Oct. 28, 2019.

*Primary Examiner* — Peter L Vajda

(57) ABSTRACT

Metal oxide-polymer composite particles have a median particle size D50 of 40-75 nm or 100-150 nm and an average RTA of at least 0.06. Alternatively or in addition, metal oxide-polymer composites comprise two or more populations of metal oxide particles differing in size, particle size distribution, or shape. Alternatively or in addition, the use of a multicomponent hydrophobizing system including an alkylsilane to fabricate metal oxide-polymer composite particles increases the tribocharge of the composite particles.

20 Claims, 13 Drawing Sheets

Related U.S. Application Data filed on Jun. 7, 2019, provisional application No. 62/715,556, filed on Aug. 7, 2018.

(51) Int. Cl.
*C08K 9/06* (2006.01)
*C09C 1/30* (2006.01)
*G03G 9/08* (2006.01)

(52) U.S. Cl.
CPC ....... *G03G 9/0821* (2013.01); *G03G 9/09708* (2013.01); *G03G 9/09716* (2013.01); *C08K 2201/002* (2013.01); *C08K 2201/005* (2013.01); *C08K 2201/009* (2013.01)

(56) References Cited

U.S. PATENT DOCUMENTS

| | | |
|---|---|---|
| 8,062,820 B2 | 11/2011 | Floess et al. |
| 8,202,502 B2 | 6/2012 | Floess et al. |
| 9,535,353 B2 | 1/2017 | Srinivasan et al. |
| 2005/0175923 A1 | 8/2005 | Nakazawa et al. |
| 2014/0295341 A1* | 10/2014 | Fomitchev ......... G03G 9/09716 430/108.4 |
| 2015/0248069 A1 | 9/2015 | Uchino et al. |
| 2015/0316889 A1* | 11/2015 | Uchino .............. G03G 9/08773 399/346 |
| 2017/0115588 A1 | 4/2017 | Fomitchev et al. |

* cited by examiner 100 nm 100 nm 200 nm 200 nm 100 nm 200 nm 100 nm

COMPOSITE PARTICLES FOR TONER ADDITIVES

This application is a national phase application of PCT/US2019/045225, filed Aug. 6, 2019 which claims priority from U.S. 62/715,556, filed Aug. 7, 2018, U.S. 62/858,585, filed Jun. 7, 2019, and U.S. 62/868,172, filed Jun. 28, 2019.

BACKGROUND OF THE INVENTION

1. Field of the Invention

This invention relates to the manipulation of the size, morphology, and tribocharge of metal oxide-polymer composite particles.

2. Description of the Related Art

Electrophotographic image formation comprises uniform charging of the surface of a photoreceptor drum or belt; exposure of the photoreceptor surface to light and formation on the photoreceptor surface of a charge pattern, i.e., a latent image, that mirrors the information to be transferred into a real image; developing the latent image with electrostatically charged toner particles comprising a colorant dispersed in a binder resin; transferring the developed toner onto a substrate, e.g. paper; fusing the image onto a substrate; and preparing the photoreceptor surface for the next cycle by erasing the residual electrostatic charges and cleaning the remaining toner particles from the photoreceptor drum.

Toners for use in electrophotography and electrostatic printing include a binder resin and a colorant and may further include a charge control agent, an offset-preventing agent, and other additives. External toner additives such as metal oxide particles are often combined with toner particles in order to improve selected properties of the toner particles, including fluidity, transferability, fixability, and cleaning properties. A variety of external additives may be used in a single toner composition to enhance different properties of the toner. For example, some additives may be selected to improve chargeability, i.e., tribocharge. Others may be selected to improve cleaning performance or humidity resistance. Of course, it is preferable that a toner additive optimized for one function is not detrimental to the functions imparted by the various additives.

One function imparted by the toner additives is spacing and maintenance of fluidity. If the toner particles adhere to one another, they will not flow as well; additives serve to reduce the cohesion of the toner powder. The additive particles tend to be hard. The toner, on the other hand, is formed from softer polymers. The resulting agglomeration of toner particles is detrimental to both the operation of the electrophotography apparatus and to the print quality. Indeed, as manufacturers have sought to reduce the energy required to produce a printed page, they have turned to softer polymers (i.e., lower Tg polymers) to reduce the amount of heat required to fuse the toner to a substrate. However, the hard additive particles can become embedded in the soft toner particles, reducing the effectiveness of the additive. Increasing the size of the additive particle reduces embedding; however, the larger particles are also heavier and exhibit a higher rate of drop-off from the toner particle. Of course, additive particles that drop off the toner cannot serve their function as part of the toner composition. The metal oxide-polymer composite particles described in U.S. Pat. No. 9,568,847 serve as a spacer between toner particles while exhibiting both limited embedding in the toner particles and limited drop-off. Now, it is desirable to further manipulate the roughness, shape, and size of the metal-oxide composite particles to improve their free-flow performance and manipulate their tribocharge characteristics and index of refraction.

SUMMARY OF THE INVENTION

In one aspect, metal oxide-polymer composite particles in powder form comprise a plurality of metal oxide particles and a polymer matrix, wherein: the metal oxide particles are surface-modified with a first hydrophobizing system comprising a bifunctional component via which the metal oxide particles are covalently attached to the polymer matrix; the polymer of the polymer matrix is a polymer or co-polymer of the bifunctional component; and the metal oxide-polymer composite particles have a volume weighted median particle size D50 of 40-75 nm and an average RTA of at least 0.06, for example, 0.06 to 0.019, 0.08 to 0.015, or 0.08-0.13.

Alternatively, metal oxide-polymer composite particles in powder form comprise a plurality of metal oxide particles and a polymer matrix, wherein the metal oxide particles are surface-modified with a first hydrophobizing system comprising a bifunctional component via which the metal oxide particles are covalently attached to the polymer matrix; the polymer of the polymer matrix is a polymer or co-polymer of the bifunctional component; and the metal oxide-polymer composite particles have a volume weighted median particle size D50 of 100-150 nm and an average RTA of at least 0.06, for example, 0.06 to 0.019, 0.08 to 0.015, or 0.08-0.13.

For either of these composite particles, the metal oxide particles may have a unimodal size distribution. The composite particles may have an average particle roughness greater than 1.22, for example, greater than 1.25, or up to 1.35, 1.60, 1.70, or 1.90. At least a portion of the surface of the metal oxide-polymer composite particles may be modified with a second hydrophobizing agent. The metal oxide-polymer composite particles may comprise at least 15% metal oxide.

The bifunctional component may have the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10. The first hydrophobizing system may further comprise a monofunctional component, e.g, a silane which is covalently attached to the metal oxide particles. The monofunctional component may have the formula $(OR^1)_{4-z}SiR^4_z$, where $R^1$ is methyl or ethyl, z is 1 or 2, and $R^4$ is a branched or unbranched C1-C10 alkyl group or $R^2Ph$, where Ph is an unsubstituted phenyl group or a phenyl group substituted with C1-C10 branched or unbranched alkyl, halogen, C1-C10 alkylether, methoxy, ethoxy, or hydroxy.

Any of the composite particles describe above may be disposed about the surface of toner particles to form a toner composition In another aspect, a toner composition comprises toner particles mixed with a powder comprising metal oxide-polymer composite particles comprising a plurality of metal oxide particles and a polymer matrix. The metal oxide particles are surface-modified with a first hydrophobizing system comprising a bifunctional component via which the metal oxide particles are covalently attached to the polymer matrix and a monofunctional component that is covalently attached to the metal oxide particles. At least a portion of the surface of the metal oxide-polymer composite particles is modified with a second hydrophobizing agent, and the polymer of the polymer matrix is a polymer or co-polymer of the bifunctional component. A tribocharge of the toner at HH conditions is at least at least 9% greater in magnitude than that of a toner comprising a control metal oxide-polymer composite in which the monofunctional component is replaced with the bifunctional component.

Alternatively or in addition, a tribocharge of the toner at LL conditions is at least 10% greater in magnitude than that of a toner comprising a control metal-oxide polymer composite in which the monofunctional component is replaced with the bifunctional component. The monofunctional component and the bifunctional component may both comprise silane groups. The monofunctional component may have the formula $(OR^1)_{4-z}SiR^4_z$, where $R^1$ is methyl or ethyl, z is 1 or 2, and $R^4$ is a branched or unbranched C1-C10 alkyl group. A solubility of the monofunctional component may be from 10 to 0.06 g/L, preferably from 9 to 0.03 g/L, more preferably from 8 to 0.1 g/L, most preferably from 7 to 0.5 g/L.

In another aspect, a method of making a composite particle comprises preparing an aqueous dispersion comprising metal oxide particles and a first hydrophobizing system comprising a bifunctional component and a monofunctional component, wherein the bifunctional component and the monofunctional component become chemically attached to the metal oxide particles; adding a polymerization initiator to the aqueous dispersion to form metal oxide-polymer composite particles having metal oxide particles at their surfaces, wherein a polymer matrix of the metal oxide-polymer composite particles is a polymer or copolymer of the first hydrophobizing system; and drying the metal oxide-polymer composite particles to form a powder.

The method may further comprise, before or after drying, treating the metal oxide-polymer composite particles with a second hydrophobizing agent to produce a hydrophobized metal oxide-polymer composite particle. The monofunctional component and the bifunctional component may both comprise silane groups. The monofunctional component may have the formula $(OR^1)_{4-z}SiR^4_z$, where $R^1$ is methyl or ethyl, z is 1 or 2, and $R^4$ is a branched or unbranched C1-C10 alkyl group. The bifunctional component may have the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10. The dispersion may further comprise one or more of styrene, a substituted or unsubstituted acrylate or methacrylate monomer, an olefin monomer, a vinyl ester, or acrylonitrile. A solubility of the monofunctional component may be from 10 to 0.06 g/L, preferably from 9 to 0.03 g/L, more preferably from 8 to 0.1 g/L, most preferably from 7 to 0.5 g/L.

In another aspect, metal oxide-polymer composite particles in powder form may comprise a plurality of metal oxide particles and a polymer matrix. The plurality of metal oxide particles comprises at least a first population of metal oxide particles and a second population of metal oxide particles, the first population of metal oxide particles having a different size, shape, or particle size distribution with respect to the second population. The metal oxide particles are surface-modified with a first hydrophobizing system comprising a bifunctional component via which the metal oxide particles are covalently attached to the polymer matrix, portions of the plurality of metal oxide particles are embedded within the polymer matrix and project out from the polymer matrix (i.e., at least a portion of the plurality of metal oxide particles, which may include at least a portion of each population of metal oxide particles) project into and out from the polymer matrix), the polymer matrix comprises a polymer or copolymer of the first hydrophobizing system, at least a portion of the surface of the metal oxide-polymer composite particle is modified with a second hydrophobizing agent, and the metal oxide-polymer composite particles have an average SF-1 from 110 to 185 and an average RTA from 0.06 to 0.19.

The first hydrophobizing system may further comprise a monofunctional component, e.g., a silane, that is covalently attached to the metal oxide particles. The bifunctional component may have the formula $[R^3_{3-x}(OR^1)_x]SiR^2Q$, where x is 1, 2, or 3, le is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10. The monofunctional component may have the formula $(OR^1)_{4-z}SiR^4_z$, where $R^1$ is methyl or ethyl, z is 1 or 2, and $R^4$ is a branched or unbranched C1-C10 alkyl group or $R^2$Ph, where Ph is an unsubstituted phenyl group or a phenyl group substituted with C1-C10 branched or unbranched alkyl, halogen, C1-C10 alkylether, methoxy, ethoxy, or hydroxy.

The volume weighted median particle sizes D50 of the first population and the second population may have a ratio of about 40:1 to about 1.5:1. The widths of the volume weighted particle size distributions, as described by the ratio D75/D25, for the first population and the second population may have a ratio of about 40:1 to about 1.1:1. The mass ratio of the first population and the second population may be from about 1:20 to about 20:1, for example, from about 1:15 to about 15:1, from about 1:10 to about 10:1, from about 1:5 to about 5:1, or from about 1:2 to about 2:1. The metal oxide-polymer composite particles may have a volume weighted median particle size D50 of about 20 nm to about 1000 nm. The metal oxide-polymer composite particles may have an average roughness $P^2/4\pi S$ from about 1.22 to about 1.9, where P is a perimeter of an image of a metal oxide-polymer composite particle and S is the area of the particle image and where both P and S are determined from transmission electron micrographs. The polymer matrix may comprise polymers of styrene, unsubstituted or substituted acrylates or methacrylates, olefins, vinyl esters, and acrylonitrile and copolymers and mixtures of the above. The composite particles may be disposed on the surface of toner particles to form a toner composition In another aspect, a method of producing a metal oxide-polymer composite particle comprises preparing an aqueous dispersion comprising a first hydrophobizing system in an aqueous medium and at least a first population of metal oxide particles and a second population of metal oxide particles, the first population of metal oxide particles having a different size, shape, or particle size distribution than the second population, wherein the first hydrophobizing system comprises a bifunctional component having the formula $[R^3_{3-x}(OR^1)_x]SiR^2Q$, where x is 1, 2, or 3, $R^1$ is methyl or ethyl, $R^e$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10; incubating the dispersion for a predetermined amount of time; adding a radical initiator to the dispersion; allowing a chemical group of the first hydrophobizing system to become part of a polymer, thereby forming metal oxide-polymer composite particles; and drying the metal oxide-polymer composite particles to obtain a powder.

The method may further comprise treating at least a portion of the metal oxide particles with a second hydrophobizing agent, wherein treating may be performed before preparing or after formation of the metal oxide-polymer composite particles. The first hydrophobizing system may further comprise a monofunctional component having the formula $(OR^1)_{4-z}SiR^4_z$, where $R^1$ is methyl or ethyl, z is 1 or 2, and $R^4$ is a branched or unbranched C1-C10 alkyl group or $R^2$Ph, where Ph is an unsubstituted phenyl group or a phenyl group substituted with C1-C10 branched or unbranched alkyl, halogen, C1-C10 alkylether, methoxy, ethoxy, or hydroxy. D50 of the first population and the second population may have a ratio of about 40:1 to 1.5:1. The ratios D75/D25 for the first population and the second population may have a ratio of about 40:1 to about 1.1:1. The mass ratio of the first population and the second population may be from about 1:20 to about 20:1.

The emulsion may further comprise one or more of styrene, a substituted or unsubstituted acrylate or methacrylate monomer, an olefin monomer, a vinyl ester, or acrylonitrile. At least a portion of each population of metal oxide particles may project into and out from the polymer matrix. The metal oxide-polymer composite particles may have a volume weighted median particle size D50 from about 20 nm to about 1000 nm. A specific density of the metal oxide-polymer composite particles when measured by helium pycnometry is from about 30% to about 90% of the specific density of the metal oxide. The metal oxide-polymer composite particles may have an average SF-1 from about 110 to about 185 and an average RTA from about 0.06 to about 0.19. The metal oxide-polymer composite particles may have an average roughness $P^2/4\pi S$ from about 1.22 to about 1.9.

It is to be understood that both the foregoing general description and the following detailed description are exemplary and explanatory only and are intended to provide further explanation of the present invention, as claimed.

BRIEF DESCRIPTION OF THE DRAWING

The invention is described with reference to the several figures of the drawing, in which.

DETAILED DESCRIPTION OF THE INVENTION

In one embodiment, production of metal oxide-polymer composite particles with a first hydrophobizing system comprising a bifunctional component and an alkyl-based monofunctional component results in particles which can increase the tribocharge of a toner with which they are used as an external additive.

In another embodiment, metal oxide-polymer composite particles having a volume weighted median particle size D50 of 40-75 nm, for example, 40-70 nm or 40-65 nm, and an average RTA of at least 0.06, for example, 0.06 to 0.019, 0.08 to 0.015, or 0.08-0.13, promote free flow characteristics of toners with which they are used as an external additive.

In another embodiment, metal oxide-polymer composite particles having a volume weighted median particle size D50 of 100-150 nm, for example, 105-150 nm or 110-150 nm, and an average RTA of at least 0.06, for example, 0.06 to 0.019, 0.08 to 0.015, or 0.08-0.13, are better able to promote anti-block in toner compositions while improving free flow with respect to smoother spacer particles.

Figure 1A:
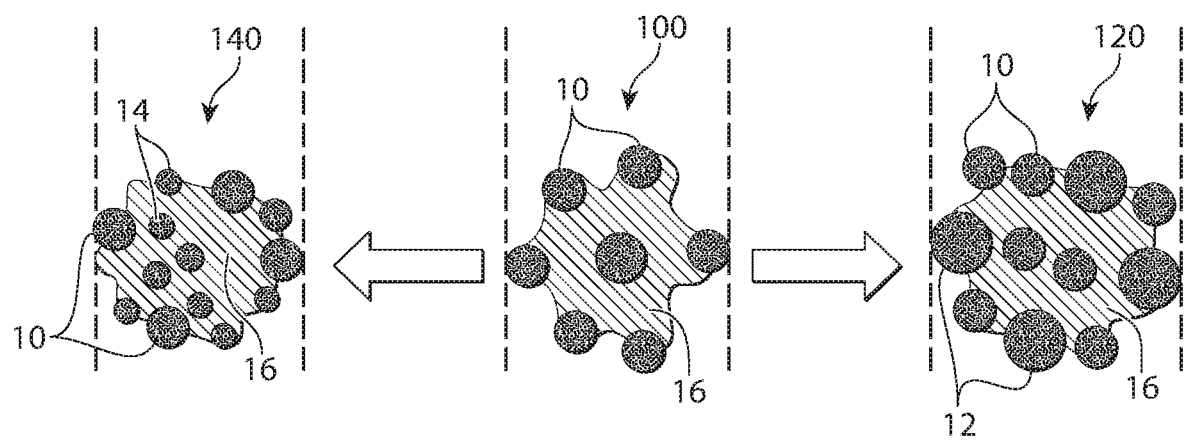
FIG. 1A is a schematic illustrating the effect on particle size and roughness when different sizes of metal oxide particles are used to produce metal oxide-polymer composite particles according to an embodiment of the invention.

In another embodiment, a toner composition includes toner particles mixed with a powder comprising metal oxide-polymer composite particles comprising at least two populations of metal oxide particles having at least different sizes, shapes, or particle size distributions and a polymer matrix. The surface of the metal oxide particles is modified with a first hydrophobizing system comprising a bifunctional component via which the metal oxide particles are covalently attached to the polymer. At least a portion of the first population of metal oxide particles, the second population of metal oxide particles, or both, project into and out from the polymer matrix, which is a polymer or copolymer of the first hydrophobizing system. Such mixtures of two or more populations of metal oxide particles enable manipulation of the size, particle roughness, and shape of the resulting composite particles, as shown in FIG. 1A. In FIG. 1A, combination of a first population of metal oxide particles 10 with larger metal oxide particles 12 or smaller metal oxide particles 14 allows the production of metal oxide composite particles 100, 120, and 140 having different particle sizes. Particle 140 is smaller than particle 100, which is smaller than composite particle 120. The schematics depict equivalent ratios of metal oxide (10, 12, and 14) and matrix material 16.

Metal oxide particles appropriate for use with the present invention include silica, alumina, ceria, molybdenum oxide, titania, zirconia, zinc oxide, iron oxides, including but not limited to magnetite ($Fe_3O_4$) and various forms of $Fe_2O_3$, niobium oxide, vanadium oxide, tungsten oxide, tin oxide, clays, or mixtures or mixed oxides of any two or more of these. For use as external toner additives, the metal oxide particles will typically include at least one of silica, alumina, and titania, for example, silica and/or titania. The metal oxide particles may have two or more different particle sizes. For example, metal oxide particles having different compositions may have different particle sizes. Alternatively or in addition, particles of a particular metal oxide, for example, silica, may have a bimodal or multi-modal particle size distribution. Of course, mixtures of two different metal oxides having the same or different compositions and two or more different particle sizes, shapes, or particle size distributions may also be employed.

Where two different size particles are used, their volume weighted median particle sizes D50 may have a ratio of about 40:1 to about 1.5:1, for example, from about 35:1 to about 2:1, from about 25:1 to about 2.5:1, from about 20:1 to about 3:1, from about 15:1 to about 4:1, or from about 10:1 to about 5:1. D50 may be measured by disc centrifuge photosedimentometry or transmission electron microscopy. Alternatively or in addition, the metal oxide particles may have a bimodal or multimodal particle size distribution. The ratios of the particle sizes corresponding to the peaks of the particle size distribution may be similar to those listed above. Alternatively or in addition, the two or more metal oxide particles may have similar D50 but different shapes. Alternatively or in addition, the different metal oxide particles may have similar D50 but their particle size distributions may have different widths. One indication of the breadth of the particle size distribution is the ratio D75/D25, the ratio of the particle size for which 75% by volume of the particles are smaller to the particle size for which 25% by volume of the particles are smaller. The ratio of breadths of the size distributions, as measured by D75/D25, for the two different size particles may be from 40:1 to 1.1:1.

Suitable particles include but are not limited to precipitated, colloidal, and pyrogenic metal oxide particles. The metal oxide particles may be produced utilizing techniques known to those skilled in the art. Exemplary commercially available titania particles include TIO-W1215 titania from Cerion, TiSolB titania from Nyacol, and Cristal ACTiV™ 55-300B titania. Exemplary commercially available tin oxide particles include Sn15 tin oxide from Nyacol.

Precipitated metal oxide particles may be manufactured utilizing conventional techniques and are often formed by the coagulation of the desired particles from an aqueous medium under the influence of high salt concentrations, acids, or other coagulants. The metal oxide particles are filtered, washed, dried, and separated from residues of other reaction products by conventional techniques known to those skilled in the art. Precipitated particles are often aggregated in the sense that numerous primary particles coagulate to one another to form a somewhat spherical aggregated cluster. Non-limiting examples of commercially available precipitated metal oxides include Hi-Sil® products from PPG Industries, Inc. and Zeosil® products available from Evonik Corporation.

The production of a fumed metal oxide is a well-documented process which involves the hydrolysis of suitable feed stock vapor (such as aluminum chloride for a fumed alumina, or silicon tetrachloride for fumed silica) in a flame of hydrogen and oxygen. Molten particles of roughly spherical shape are formed in the combustion process, and the particle diameters may be varied through control of process parameters. These molten spheres, referred to as primary particles, fuse with one another by undergoing collisions at their contact points to form branched, three dimensional chain-like aggregates. The formation of the aggregates is considered irreversible as a result of the fusion between the primary particles. During cooling and collecting, the aggregates undergo further collisions that may result in some mechanical entanglements to form agglomerates. These agglomerates are thought to be loosely held together by van der Waals forces and can be reversed, i.e. de-agglomerated, by proper dispersion in a suitable media. Mixed or co-fumed metal oxide particles may also be produced utilizing conventional techniques known to those skilled in the art including, for example, those described in GB 2296915A to Ettlinger et al., the specification of which is incorporated herein in its entirety by reference.

Alternative metal oxide morphologies may be obtained using the methods disclosed in U.S. Pat. Nos. 4,755,368, 6,551,567, and 6,702,994, US Patent Publication No. 20110244387, in Mueller, et al., "Nanoparticle synthesis at high production rates by flame spray pyrolysis," Chemical Engineering Science, 58: 1969 (2003), and in Naito, et al., "New Submicron Silica Produced by the Fumed Process," published in NIP 28: International Conference on Digital Printing Technologies and Digital Fabrication 2012, 2012, p. 179-182, the contents of all of which are incorporated by reference. These methods typically result in metal oxide particles with low structure and surface area. Many of these particles are pyrogenic, that is, they are produced in a flame. Other methods of producing pyrogenic particles are disclosed, for example, in Kodas and Hampden-Smith, *Aerosol Processing of Materials*, Wiley-VCH, 1998. Suitable pyrogenic metal oxides for use in the composite particles provided herein are small, e.g., with volume average diameters less than 200 nm.

Colloidal metal oxide particles are often non-aggregated, individually discrete (primary) particles, which typically are spherical or nearly spherical in shape, but can have other shapes (e.g., shapes with generally elliptical, square, or rectangular cross-sections). Colloidal metal oxides are commercially available or can be prepared by known methods from various starting materials (e.g., wet-process type metal oxides). Colloidal metal oxide particles are typically fabricated in a manner similar to precipitated metal oxide particles (i.e., they are coagulated from an aqueous medium) but remain dispersed in a liquid medium (often water alone or with a co-solvent and/or stabilizing agent). Metal oxide particles can be prepared, for example, from silicic acid derived from an alkali silicate solution having a pH of about 9 to about 11, wherein the silicate anions undergo polymerization to produce discrete silica particles having the desired particle size in the form of an aqueous dispersion. Typically, the colloidal metal oxide starting material will be available as a sol, which is a dispersion of colloidal metal oxide in a suitable solvent, most often water alone or with a co-solvent and/or stabilizing agent. See, e.g., Stoeber, et al., "Controlled Growth of Monodisperse Silica Spheres in the Micron Size Range," Journal of Colloid and Interface Science, 26, 1968, pp. 62-69, Akitoshi Yoshida, Silica Nucleation, Polymerization, and Growth Preparation of Monodispersed Sols, in Colloidal Silica Fundamentals and Applications, pp 47-56 (H. E. Bergna & W. O. Roberts, eds., CRC Press: Boca Raton, Florida, 2006), and Iler, R. K., *The Chemistry of Silica*, p 866 (John Wiley & Sons: New York, 1979). Non-limiting examples of commercially available colloidal metal oxides suitable for use in the invention include SNOWTEX® products from Nissan Chemical, LUIDOX® products available from W.R. Grace & Co., NexSil™ and NexSil A™ series products available from Nyacol Nanotechnologies, Inc., Quartron™ products available from Fuso Chemical, and Levasil® products available from AkzoNobel.

Colloidal metal oxide particles may have a median particle size D50 (volume weighted) from about 5 to about 300 nm, for example, from about 5 to about 10 nm, from about 10 to about 20 nm, from about 20 nm to about 30 nm, from about 30 to about 50 nm, from about 50 to about 70 nm, from about 70 to about 100 nm, from about 100 nm to about 125 nm, from about 125 nm to about 150 nm, from about 150 nm to about 175 nm, from about 175 nm to about 200 nm, from about 200 nm to about 225 nm, from about 225 nm to about 250 nm, from about 250 nm to about 275 nm, or from 275 nm to about 300 nm. Of course, mixtures of particles of different volume weighted median particle sizes D50 may include particles having particle sizes in two or more of these ranges. The metal oxide particles may be spherical or non-spherical. For example, the aspect ratio of the metal oxide particles may be from about 1.5 to about 3, for example, from about 1.5 to about 1.8, from about 1.8 to about 2.1, from about 2.1 to about 2.5, from about 2.5 to about 2.8, or from about 2.8 to about 3. Particle size be measured by disc centrifuge photosedimentometry or transmission electron microscopy following dispersion of particles as described in the Examples below.

In one embodiment, to make the composite particles, the metal oxide particles are treated with a first hydrophobizing system. The first hydrophobizing system may include one or more hydrophobizing components. Preferably, the first hydrophobizing system includes at least one bifunctional component including a first reactive group, e.g., a silane, that can be covalently or non-covalently attached to the metal oxide particle and a second reactive group that can be incorporated into the polymer of the metal oxide-polymer composite particle. In certain implementations, the bifunctional component will have a molecular weight less than 300. "Hydrophobic" metal oxide particles, as the term is used herein, encompass varying levels or degrees of hydrophobicity. The degree of hydrophobicity imparted to the metal oxide particles will vary depending upon the type and amount of treating agent used. Hydrophobic metal oxide particles for use with the invention may, for example, have from about 15% to about 85% of the available metal oxide surface hydroxyl groups reacted, for example, from about 25% to about 75% or from about 40% to about 65% of the available metal oxide surface hydroxyl groups reacted or a percentage in any range bounded by any two of the above endpoints. Where a second hydrophobizing agent is used, as discussed below, it will react to form a covalent or non-covalent bond with a portion of the surface hydroxyl groups of the metal oxide.

The bifunctional component may have the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is mercapto, glycidyl, or a substituted or unsubstituted vinyl, acrylate ester or methacrylate ester group, with the proviso that when Q is unsubstituted or substituted vinyl, n=2-10. The first hydrophobizing system may further include a monofunctional component having the formula $(OR^1)_{4-z}SiR^4_z$, where z is 1 or 2 and $R^4$ is a branched or unbranched C1-C10 alkyl group or $R^2Ph$, where Ph is an unsubstituted phenyl group or a phenyl group substituted with C1-C10 branched or unbranched alkyl, halogen, C1-C10 alkylether, methoxy, ethoxy, or hydroxy. Exemplary agents suitable for use in the first hydrophobizing system include but are not limited to (3-acryloxypropyl)trimethoxysilane, isobutyltrimethoxysilane, propyltrimethoxysilane, mercaptopropyltrimethoxysilane, glycidoxypropyltrimethoxysilane, (3-acryloxypropyl) tri ethoxysilane, 3-methacryloxypropyltrimethoxysilane, methacryloxypropyltriethoxysilane, methacryloxymethyltrimethoxysilane, methacryloxymethyltriethoxysilane, (3-acryloxypropyl)methyldimethoxysilane, 3-methacryloxypropylmethyldimethoxysilane, 3-methacryloxypropyldimethylethoxysilane, 3-butenyltrimethoxysilane, 3-butenyltriethoxysilane, 4-pentenyltriethoxysilane, 4-pentenyltrimethoxysilane, 5-hexenetrimethoxysilane, 5-hexenemethyldimethoxy silane, 3-methacryloxypropyldimethylmethoxysilane, diisobutyldimethoxysilane, and diisopropyldimethoxysilane. Where the metal oxide particle is not silica, di- or tri-functional silanes should be used (i.e., x should be 2 or 3).

The solubility of the components of the first hydrophobizing system may be from 10 to 0.06 g/L, preferably from 9 to 0.03 g/L, more preferably from 8 to 0.1 g/L, most preferably from 7 to 0.5 g/L. If the solubility of a component of the first hydrophobizing system is too high or too low, it is theorized that the component will not form a satisfactory emulsion.

In some embodiments, $R^4$ is preferably a branched or unbranched C1-C10 alkyl group. When $R^4$ is a branched or unbranched alkyl group, the tribocharge of the metal oxide-polymer composite particle is higher in comparison to when other $R^4$ groups are used or when a monofunctional component is not used at all. For example, the magnitude of the tribocharge at low temperature/low humidity (LL) conditions of a toner employing the metal oxide-polymer composite particle as an external additive may be increased by at least 10%, for example, by up to 45%, for example, from 12% to 42%, from 15% to 40%, from 17% to 37%, from 20% to 35%, from 23% to 32%, or from 25% to 30% with respect to toner with a metal oxide-polymer composite particle not including a monofunctional component. Alternatively or in addition, the magnitude of the tribocharge of such a toner at high temperature, high humidity (HH) conditions may be increased by at least 9%, for example, by up to 33%, for example, from 12% to 30%, from 15% to 28%, or from 17% to 25% with respect to a toner with a metal oxide-polymer composite particle not including a monofunctional component. Typically, the tribocharge at HH and LL conditions both change with the addition of an alkyl-containing monofunctional component, and change in HH and the change in LL tribocharge may be in any combination of ranges selected from the lists above.

At least a portion of the metal oxide particles may additionally be treated with a second hydrophobizing agent, either before or after treatment with the first hydrophobizing system or after formation of the metal oxide-polymer composite particle, in which case only the exposed surfaces of the metal oxide particles are treated. Preferred agents for use as the second hydrophobizing agent are silazane compounds, siloxane compounds, and silane compounds, and silicone fluids having some solubility in water, with or without a co-solvent. Mixtures of two or more agents may be used. Preferably, silicone fluids for use as the second hydrophobizing agent have a number average molecular weight of at most 500. Examples of silane compounds include alkylsilanes, and alkoxysilanes. Alkoxysilanes include compounds having the general formula: $R'_xSi(OR")_{4-x}$, wherein R' is selected from the group consisting of $C_1$-$C_{30}$ branched and straight chain alkyl, alkenyl, $C_3$-$C_{10}$ cycloalkyl, and $C_6$-$C_{10}$ aryl, R" is $C_1$-$C_{10}$ branched or straight chain alkyl, and x is an integer of 1-3. Where the metal oxide particle does not include silica, use of a di- or tri-functional silane or a siloxane or silicone fluid as the second hydrophobizing agent will provide better attachment than a monofunctional silane.

Non-limiting examples of silane compounds that may be employed as the second hydrophobizing agent as taught herein include trimethylsilane, trimethylchlorosilane, dimethyldichlorosilane, methyltrichlorosilane, allyldimethylchlorosilane, benzyl dim ethyl chlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-octyltriethoxysilane, n-hexadecyltrimethoxysilane, n-octadecyltrimethoxysilane, and the like. Amine-functionalized alkylalkoxysilanes may be employed as well. Non-limiting examples of useful siloxane compounds include octamethylcyclotetrasiloxane, hexamethylcyclotrisiloxane, and the like. Non-limiting examples of useful silazane compounds include hexamethyldisilazane (HMDZ), hexamethylcyclotrisilazane, octamethylcyclotetrasilazane, and the like. For example, HMDZ may be used to cap unreacted hydroxyl groups on the surface of the metal oxide particle. Exemplary hydrophobicity-imparting agents also include hexamethyldisilazane, isobutytrimethoxysilane, octyltrimethoxysilane and cyclic silazanes such as those disclosed in U.S. Pat. No. 5,989,768. Such cyclic silazanes are represented by the

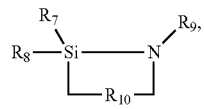

formula where wherein $R_7$ and $R_8$ are independently selected from the group consisting of: hydrogen, halogen, alkyl, alkoxy, aryl, and aryloxy; $R_9$ is selected from the group consisting of: hydrogen, $(CH_2)_rCH_3$, wherein r is an integer from 0 to 3, $C(O)(CH_2)_rCH_3$, wherein r is an integer from 0 to 3, $C(O)NH_2$; $C(O)NH(CH_2)_rCH_3$, wherein r is an integer from 0 to 3, and $C(O)N[(CH_2)_rCH_3](CH_2)_sCH_3$, wherein r and s are integers from 0 to 3; and $R_{10}$ is represented by the formula $[(CH_2)_a(CHX)_b(CYZ)_c]$, wherein X, Y and Z are independently selected from the group consisting of: hydrogen, halogen, alkyl, alkoxy, aryl, and aryloxy, and a, b, and c are integers from 0 to 6 satisfying the condition that (a+b+c) equals an integer from 2 to 6. The cyclic silazane may be a five or six member

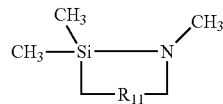

ring having the formula wherein Ru is represented by the formula $[(CH_2)_a(CHX)_b(CYZ)_c]$, wherein X, Y and Z are independently selected from the group consisting of: hydrogen, halogen, alkyl, alkoxy, aryl, and aryloxy, and a, b, and c are integers from 0 to 6 satisfying the condition that (a+b+c) equals 3 or 4.

Suitable silicone fluids for use as the second treatment agent include both non-functionalized silicone fluids and functionalized silicone fluids. Depending on the conditions used to surface treat the metal oxide particles and the particular silicone fluid employed, the silicone fluid may be present as a non-covalently bonded coating or may be covalently bonded to the surface of the metal oxide particles. Non-limiting examples of useful non-functionalized silicone fluids include polydimethylsiloxanes, polydiethylsiloxanes, phenylmethylsiloxane copolymers, fluoroalkylsiloxane copolymers, diphenylsiloxane-dimethylsiloxane copolymers, phenylmethylsiloxane-dimethylsiloxane copolymers, phenylmethylsiloxane-diphenylsiloxane copolymers, methylhydrosiloxane-dimethylsiloxane copolymers, hydroxyl-functionalized or terminated siloxanes, polyalkylene oxide modified silicones, and the like. Functionalized silicone fluids can comprise, for example, functional groups selected from the group consisting of vinyl, hydride, hydroxyl, silanol, amino, and epoxy. The functional groups may be bonded directly to the silicone polymer backbone or may be bonded through intermediary alkyl, alkenyl, or aryl groups.

Alternatively or in addition, the dimethylsiloxane co-polymers disclosed in U.S. Patent Publication No. 20110244382, the contents of which are incorporated herein by reference, may be used to treat the metal oxide particles. Exemplary dimethylsiloxane co-polymers include co-polymers of the formula:

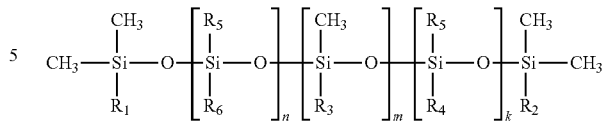

(1)

wherein $R_1$ is —H, —$CH_3$, $R_2$=—H, —$CH_3$, $R_3$=—$CH_3$, —$CH_2CH_3$, —$CH_2CH_2CH_3$, $CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group, $R_4$ is —$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group, $R_5$ is —$CH_3$, —$CH_2CH_3$, —$CH_2Ar$, —$CH_2CH_2Ar$, or —Ar, $R_6$ is —H, —OH, —$OCH_3$, or —$OCH_2CH_3$, Ar is unsubstituted phenyl or phenyl substituted with one or more methyl, halogen, ethyl, trifluoromethyl, pentafluoroethyl, or —$CH_2CF_3$ groups, n, m, and k are integer numbers, n≥1, m≥0, and k≥0, and wherein the co-polymer has a molecular weight from 208 to about 20,000.

Alternatively or in addition, the second hydrophobizing agent may be a charge modifying agent. Any of the charge modifying agents disclosed in U.S. Patent Publication No. 2010/0009280, the contents of which are incorporated herein by reference, may be employed herein. Exemplary charge modifying agents include but are not limited to 3-(2,4-dinitrophenylamino) propyltriethoxysilane (DNPS), 3,5-dinitrobenzamido-n-propyltriethoxysilane, 3-(triethoxysilylpropyl)-p-nitrobenzamide (TESPNBA), pentafluorophenyltriethoxysilane (PFPTES), and 2-(4-chlorosulfonylphenyl)ethyltrimethoxysilane (CSPES). Charge modifying agents including nitro groups should be used to post-treat the metal oxide particles after the co-polymer, as the hydride groups may reduce the nitro groups.

Alternatively or in addition to the second hydrophobizing agent, the metal oxide particles may be treated with a third hydrophobizing agent following formation of the metal oxide-polymer composite. The third treating agent can be an alkylhalosilane or a silicone fluid having a number average molecular weight greater than 500. Alkylhalosilanes include compounds having the general formula $R'_xSiR''_yZ_{4-x-y}$, where R' and R'' are as defined above, Z is a halogen, preferably chlorine, and y is 1, 2, or 3.

Depending on the interaction between the second hydrophobizing agent (when used after formation of the metal oxide-polymer particle) and/or the third hydrophobizing agent and the polymer component of the metal oxide-polymer composite particles, these agents may also surface treat the exposed polymer surface of the metal oxide-polymer composite particles.

The polymer employed in the metal oxide-polymer composite particles may be the same or different as the polymer or co-polymer of the first hydrophobizing system. That is, where the first hydrophobizing system includes one or more polymerizable groups, the same material may simply be used to form the polymer. In certain implementations, the polymer of the bifunctional component is not a polyether. Alternatively or in addition, the polymer of the bifunctional component is an acrylate or methacrylate polymer. Alternatively or in addition, a different monomer or a cross-linking agent that can copolymerize with the terminal group on the bifunctional component may be employed. Suitable monomers that may be used to produce the metal oxide-polymer composite particles include substituted and unsubstituted vinyl and acrylate (including methacrylate) monomers and other monomers that polymerize by radical polymerization. Exemplary monomers include styrene, acrylates and methacrylates, olefins, vinyl esters, and acrylonitrile and are easily available to those of skill in the art, for example, from Sigma-Aldrich (Milwaukee, WI). Such co-monomers may also be substituted with C1-C3 alkyl, halogen, and/or hydroxyl groups. Substituted co-monomers include but are not limited to hydroxypropylmethacrylate, trifluoropropylmethacrylate, and α-methyl styrene. Any of these monomers may be used by themselves, in mixtures to form copolymers, or in conjunction with cross-linking agents. Exemplary cross-linking agents include divinyl terminated versions of the bifunctional component (e.g., with the silane replaced by a vinyl group) or other well-known vinyl cross-linking agents, such as divinyl benzene and ethylene glycol dimethacrylate. Alternatively or in addition, the co-monomer or cross-linking agent may react with the silane. For example, silanol-terminated siloxane polymers or the copolymer of Formula (1) above may be used in conjunction with the first hydrophobizing system. The co-monomer or cross-linking agent may be added at the same time or at a different time than the first hydrophobizing system. The amount of cross-linking agent may be adjusted to control the degree of cross-linking in the final polymer.

The metal oxide-polymer composite particles may be made by creating a dispersion of metal oxide particles in a fluid comprising the first hydrophobizing system, optional monomer, and an aqueous phase. Polymerization of the polymerizable species of the organic phase results in the composite particles. In one exemplary procedure, an emulsion or mixture is prepared with the first hydrophobizing system and optional co-monomers and cross-linking agents and metal oxide particles at a ratio of about 0.5 to about 40, for example, about 1 to about 1.5, about 1.5 to about 2, about 2 to about 3, about 3 to about 10, about 15 to about 30, or about 10 to about 20 by mass (polymerizable species/metal oxide) in aqueous media, e.g., water with an optional co-solvent such as an alcohol, e.g., isopropyl alcohol. The total amount of metal oxide particles and polymerizable species with respect to the total amount of solvent may be from about 5 wt % to about 45 wt %, for example from 5 wt % to about 15 wt %, from about 15 wt % to about 20 wt %, from about 20 wt % to about 30 wt %, from about 30 wt % to about 40 wt %, or from about 40 wt % to about 45 wt %.

The pH is optionally brought to about 8.0-10 and the dispersion is stirred (typically 1-3 hours) while the temperature is maintained at 25-60° C. Following stirring, an initiator at a level of about 0.1 to about 4 wt % with respect to monomer, for example, from about 0.1 to about 0.5%, about 0.5% to about 1%, from about 1% to about 1.5%, from about 1.5% to about 2%, from about 2% to about 2.5%, from about 2.5% to about 3%, from about 3% to about 3.5%, or from about 3.5% to about 4%. The initiator may be introduced as a powder or as a solution in ethanol, acetone, or other water-miscible solvent. Suitable initiators include but are not limited to oil soluble azo or peroxide thermal initiators such as 2,2'-azobis(2-methylpropionitrile) (AIBN), benzoyl peroxide, tert-butyl peracetate, and cyclohexanone peroxide. A variety of suitable initiators are available from Wako Pure Chemical Industries, Ltd. (Osaka, Japan). The initiator may be dissolved in the monomer prior to the introduction of the metal oxide and may partition between the monomer and the aqueous phase. The resulting solution is incubated at 65-95° C. with stirring for 4-6 hours. The resulting slurry may be dried at 100-130° C. overnight and the remaining solid milled to produce a powder. Other methods of isolating particulates from a liquid may also be used to dry the particles. Where a second hydrophobizing agent is added after formation of the metal oxide-polymer composite, it may be introduced before the drying step. For example, the second hydrophobizing agent may be added and the slurry stirred for an additional 2-4 hours with incubation at 60-75° C.

One of skill in the art will recognize that, in addition to the size and shape of the two or more populations of metal oxide particles and their proportions to each other in the reaction mixture, variables such the solids loading in the mixture or emulsion, the proportion of polymer and metal oxide, the pH of the aqueous phase, and the incubation temperature will influence the morphology of the composite particles. Indeed, for a given diameter of metal oxide-polymer composite particle, dramatic changes in metal oxide particle size and solids loading in the mixture or emulsion may be used to adjust the shape and particle roughness of the composite particle. In certain embodiments, the composite particles have metal oxide particles disposed within the composite particles, i.e., completely within the polymer phase, as well as protruding from the surface. In these embodiments, the metal oxide particles contribute to mechanical reinforcement of the composite particles, increasing their compressive strength.

The degree of surface treatment of the metal oxide with the first hydrophobizing system may be controlled by adjusting the pH and temperature of the initial solution. The rate of adsorption of the bifunctional component and any monofunctional component onto the metal oxide particles (which adsorption may be followed by the formation of a siloxane bond between the surface and the respective component) may also be controlled by the choice of the leaving group on a silane-based bifunctional or monofunctional component, e.g., ethoxy tends to hydrolyze more slowly than methoxy.

The size and particle size distribution of the metal oxide-polymer composite particles may be controlled by adjusting the proportions and relative particle sizes and/or particle size distributions of the metal oxide particles. To the extent that the size of the metal oxide-polymer composite particle is influenced by the size of the metal oxide particle, for a given composite particle produced with a first metal oxide particle, the size of the composite particle may be increased by substituting at least a portion of the first metal oxide particles with second metal oxide particles having a larger diameter. Likewise, substituting at least a portion of the first metal oxide particles with second metal oxide particles having a smaller diameter will decrease the size of the resulting composite particle.

Regardless of the metal oxide particle size distribution, the roughness of the metal oxide-polymer composite particles may be adjusted by modifying the reaction conditions. In general, increasing the pH of the reaction mixture, e.g., by addition of ammonium hydroxide or use of a base-stabilized metal oxide dispersion, will increase particle roughness or RTA. Decreasing the solids loading in the reaction medium will also increase particle roughness and RTA.

Where a mixture of two populations of metal oxide particles is used, the proportion of the first metal oxide particles and the second metal oxide particles may be from about 1:20 to about 20:1 by mass, for example, from about 1:15 to about 15:1, from about 1:10 to about 10:1, from about 1:5 to about 5:1, or from about 1:2 to about 2:1. The desired proportion of the first metal oxide particles and the second metal oxide particles may change depending on the desired composite particle size and the particle size of the first and second metal oxide particles.

At least a portion of the metal oxide particles in the composite particle may be entirely embedded within the polymer portion of the composite particle. Alternatively or in addition, at least a portion of the metal oxide particles may be partially embedded in the polymer portion of the composite particles; i.e., portions of the metal oxide particles project into and out from the polymer matrix. In certain embodiments, metal oxide particles exposed at the surface of the composite may have about 0% to about 95%, for example, about 5% to about 90%, about 10% to about 20%, about 20% to about 30%, about 30% to about 40%, about 40% to about 50%, about 50% to about 60%, about 60% to about 70%, about 70% to about 80%, or about 80% to about 90% of their length projecting from the surface of the metal oxide-polymer composite particles, as measured on metal oxide particles observable by electron microscopy of at least 200, preferably at least 500 metal oxide-polymer composite particles. The amount of the metal oxide particles projecting from the surface of the metal oxide-polymer composite particle may vary depending on the size and/or shape of the metal oxide particles and the ratio of the median particle size D50 or particle size distributions (described as D75/D25) of one or more populations of metal oxide particles.

The metal oxide-polymer composite particles may be round. It will be understood that round particles need not be spherical but will typically have a "bumpy" surface depending on degree to which the metal oxide particles are exposed at the surface of the composite particle. Alternatively, the use of two populations of metal oxide particles with a large size difference will also lead to the formation of non-equiaxed particles. Such particles combine an irregular shape with high particle roughness.

The shape and degree of "bumpiness," or roughness, of the metal oxide-polymer composite particles may be analyzed by TEM (transmission electron microscope) evaluation. Conventional image analysis software is used to define a perimeter P of a TEM image of the particle. The same software is used to calculate particle image area S and to identify the maximum Feret diameter (Dmax) 20 across the particle, measured between two parallel lines 22 each tangent to the particle (see FIG. 1B). These measurements are made for multiple particles, preferably at least 100 particles, more preferably at least 500 particles, on multiple TEM images.

SF-1 is an indicator of how much particle shape deviates from a sphere and is calculated as $100(\pi Dmax^2/4S)$. SF-1 of an ideal spherical particle is 100. The larger the SF-1 is, the more the particle shape deviates from a sphere. The average SF-1 for the composite particles may be from about 110 to about 185, for example, from about 110 to about 125, from about 125 to about 150, or from about 150 to about 185.

Figure 1B:
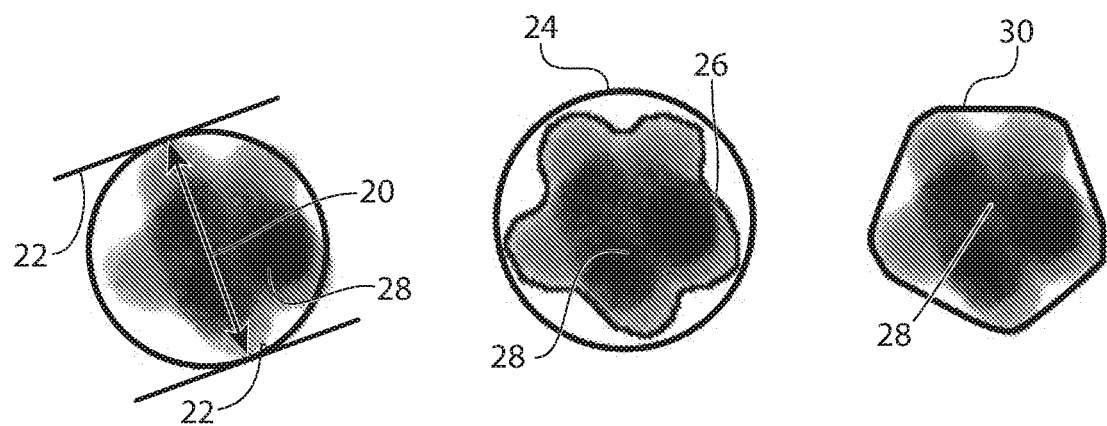
FIG. 1B is a schematic illustrating several measurements used for characterization of particles using transmission electron microscopy.

Particle Roughness may be calculated as $P^2/4\pi S$ (John C. Russ, *The Image Processing Handbook*, CRC Press, 4$^{th}$ edition, 2002). FIG. 1B illustrates that particle roughness can be thought of as a ratio between the area of a hypothetical circle 24 having a perimeter the same length as the perimeter 26 of the particle 28 and the area of the actual particle. The roughness of an ideal spherical particle is 1.0. However, the particle roughness of a spherical particle with a rough surface can be well over 1. Particle roughness is particularly sensitive to surface texture and roughness at very fine scale. Because the particle roughness equation includes both perimeter and image area, it is also indicative of particle shape, particularly deviation of the particle shape from a sphere. For example, the particle roughness for an ellipse with axis 1 and 2 is 1.19, and for an ellipse with axis 1 and 3 is 1.51. Thus, the particle roughness increases with increasing surface roughness as well as increasing deviation of the particle shape from a sphere. The average roughness of the metal oxide-polymer composite particles may be from 1.15 to 1.9, for example, from 1.15 to 1.2, from 1.2 to 1.5, from 1.5 to 1.7, or from 1.7 to 1.9. To improve free flow, the average roughness of the metal oxide-polymer composite particles is preferably greater than 1.22, for example, greater than 1.25.

Alternatively or in addition, the same image analysis software may be used to construct a convex hull 30 about the image of the particle and determine the area C inside the hull, termed "hull area". A convex hull is a curved convex bounding surface enclosing the entire particle. It is generated by moving a pair of parallel lines until they just touch the exterior of the particle image. The angle of the parallel lines is then changed and the process repeated until the entire path of the convex hull is defined. As shown in FIG. 1B, the convex hull resembles a rubber band stretched around the particle. The relative trough area (RTA), is defined by (C—S)/S, where S is the particle image area. The value of RTA increases with increasing protrusions from the surface. The RTA of a perfect sphere, ellipse, or any convex object is 0. The RTA of a typical non-aggregated colloidal silica is about 0.01. The average RTA of the metal oxide-polymer composite particles may be from 0.01 to about 0.19, for example from about 0.03 to about 0.15, from about 0.05 to about 0.13, or from about 0.07 to about 0.11. To facilitate toner free flow, the average RTA is preferably greater than 0.06 or 0.08, for example, from 0.06 to 0.13. The average RTA is measured using images of at least 100 particles, preferably at least 500 particles. Of course, using more particle images will provide greater sensitivity and facilitate distinguishing different particle morphologies.

Preferably, the metal oxide composite particles have an average SF-1 in the range or any of the subranges described above and an average RTA in the range or any of the subranges described above. In addition, they may also have an average particle roughness in the range or any of the subranges described above. Particles having at least an average SF-1 and an average RTA as described above may exhibit improved drop-off performance in toner with respect to smoother or rounder particles.

Alternatively or in addition, the metal oxide-polymer composite particles may have an median particle size or diameter D50 (volume weighted) of about 20 nm to about 1000 nm. For example, D50 of the metal oxide-polymer composite particles may be 20 nm to 100 nm, 100 nm to 200 nm, 200 nm to 300 nm, 300 nm to 400 nm, 400 nm to 500 nm, 500 nm to 600 nm, 600 nm to 700 nm, 700 nm to 800 nm, 800 nm to about 900 nm, or 900 to 1000 nm. Particle size of the metal-oxide composite particles may be measured by disc centrifuge photosedimentometry.

As demonstrated in the Examples, toner cohesion increases with particle size and decreases with particle "bumpiness" as measured by RTA. Toner cohesion is inversely related with free flow. To improve toner free flow, the as-produced metal oxide-polymer composite particles preferably have D50 of 40-75 nm, for example, 40-70 nm or 40-65 nm, an average RTA of at least 0.06 or at least 0.08, for example, 0.06 to 0.019, 0.08 to 0.015, or 0.08-0.13, and optionally an average particle roughness of at least 1.22, for example, from 1.25 to 1.60 or 1.70 or from 1.22 to 1.35. It is expected that particles with D50 smaller than 40 nm will have a greater tendency to become embedded in the toner surface, and particle size is inversely correlated with free flow performance.

To improve anti-blocking and prevent toner particles from sticking to one another, the metal oxide-polymer composite particles preferably have D50 of 100-150 nm, for example, from 105-150 nm or 110-150 nm, an average RTA of at least 0.06 or at least 0.08, for example, 0.06 to 0.019, 0.08 to 0.015, or 0.08-0.13, and, alternatively or in addition, an average particle roughness of at least 1.22, for example, at least 1.25 or at least 1.3, for example, from 1.25 to 1.60 or 1.70 or from 1.22 to 1.35. Toner free flow performance tends to decline as the size of the external additive increases. However, larger particles are better able to avoid becoming embedded in the soft toner surface. By increasing the roughness of the composite particles, the free flow performance is improved, counteracting the effect of the increased size and allowing the composite particles to be optimized to maintain anti-block and free flow performance.

The metal oxide-polymer composite particles preferably have a density less than the specific density of the metal oxide itself (e.g., silica has a specific density of 2.2 g/cm$^3$, titanium dioxide has a density of 3.6 g/cm$^3$). For example, the specific density of the composite particles may be from about 30% to about 35%, about 35% to about 40%, 40% to about 45%, about 45% to about 50%, about 50% to about 55%, about 55% to about 60%, about 60% to about 63%, from about 63% to about 67%, from about 67% to about 70%, from about 70% to about 73%, from about 73% to about 76%, from about 76% to about 79%, from about 79% to about 82%, from about 82% to about 85%, or from about 85% to about 90% of the specific density of the metal oxide contained therein. The density may be measured by helium pycnometry. In some embodiments, by using two different sizes of metal oxide particle in the composite, the size and shape of the composite particle may be altered while maintaining a desired density. Maintaining a desired density may permit the skilled artisan to reduce or maintain drop-off performance or maintain other aspects of toner performance during fusing or may permit the particle morphology to be changed without modifying its refractive index.

The metal oxide-polymer composite particles may be used as external additives for both conventional and chemical toners. Conventional toners can be prepared by a number of known methods, such as admixing and heating a resin, pigment particles, optional charge enhancing additives and other additives in conventional melt extrusion devices and related equipment. Conventional equipment for dry blending of powders may be used for mixing or blending the carbon black particles with the resin. Other methods include spray drying and the like. Compounding of the pigment and other ingredients with the resin is generally followed by mechanical attrition and classification to provide toner particles having a desired particle size and particle size distribution. Chemical toners, also known as chemically prepared toners, are produced in a liquid phase; the resin particles are generally formed in the presence of the colorant. For example, a process has been developed in which a polymer latex is combined with an aqueous pigment dispersion and agglomerated using a coagulant to form polymer particles. Another process involves the aqueous suspension polymerization of a dispersion of pigment in at least one monomer. Also, a pigment/polyester resin dispersion has been prepared and combined with water, followed by evaporation of the solvent.

For both conventional and chemically prepared toners, the metal oxide-polymer composite particles may be combined with the toner particles in the same manner as conventional additives such as fumed metal oxides or colloidal metal oxide. For example, toner compositions can be formulated by mixing a suitable amount of the metal oxide-polymer composite particles in a blender with toner particles having a suitable size. Alternatively or in addition, the metal oxide-polymer composite particles may be combined with toner for use as an external additive by dry blending the toner particles with the core-shell composite particles using a Henschel or other appropriate mixer, such as the mixers described in U.S. Pat. Nos. 9,470,993, 9,500,970, 9,575,425, JP2019-095616, JP2018-045006, or JP 2018-036596. Alternatively, a dispersion of the metal oxide-polymer composite particles may be combined with toner particles by a wet blending method such as that disclosed in WO2014/153355. For example, toner may be sonicated with a dispersion of the composite particles until a well-mixed dispersion is obtained. The toner particles with metal oxide-polymer particles disposed or distributed about their surfaces may then be recovered from the dispersion, for example, by vortexing and drying or by other methods of recovering particles from dispersion. Alternatively or in addition, the metal oxide-polymer composite particles may be combined with toner at the same time as other external additives such as additional inorganic, composite, or organic particles or in a separate mixing step. A wide variety of particles for use as external toner additives are known to those of skill in the art and may be used in combination with one or more of the metal oxide-polymer composite particles provided herein. Exemplary external additives known to those of skill in the art include but are not limited to fumed silica, colloidal silica, titania, polymer particles, fatty acid salts, and other external additives suitable for use with toners. Fumed silica and other naturally hydrophilic materials are typically rendered hydrophobic for use as toner additives.

In certain embodiments, the metal oxide-polymer composite particles make up from about 0.5% to about 7% by weight of the toner composition, for example, from about 0.5% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5%, from about 5% to about 5.5%, from about 5.5% to about 6%, from about 6% to about 6.5% or from about 6.5% to about 7% by weight of the toner composition. The metal oxide-polymer composite particles may be distributed on the surface of the toner particles. Preferably, surface coverage by the metal oxide-polymer composite particles is about 10% to about 90% of the toner surface, for example, from 10% to 20%, from 15% to 25%, from 20% to 30%, from 25% to 35%, from 30% to 40%, from 15% to 80%, from 25% to 75%, from 30% to 70%, from 35% to 65%, from 40% to 60%, from 45% to 55%, or from 10% to 45%. The optimal surface coverage of the metal oxide-polymer particles on the toner will depend on the other materials, e.g., inorganic particles or polymer particles, that are also used as external additives and on the nature and composition of the toner and any carrier or developer used with the toner. The distribution of the metal oxide-polymer composite particles on the toner may be relatively uniform. For example, a coefficient of variation of the distribution of composite particles on the toner, as measured by scanning electron microscopy as described in US20150037719, the contents of which are incorporated herein by reference, may be less than 0.40, for example, less than 0.30, for example, from 0.05 to 0.15, from 0.10 to 0.20, or from 0.15 to 0.25.

The metal oxide-polymer composite particles preferably exhibit low levels of drop-off, which may promote toner durability and improve print quality over long print runs. While the retention of the composite particles on a toner particle depends in part on the composition of the toner, a proxy test may be used to compare the performance of metal oxide-polymer composite particles and metal oxide particles of a comparable size and shape. For example, a test similar to those described in US2003/0064310A1, US2010/0009282A1, US2006/0240350A1, and U.S. Pat. No. 9,568,847 may be used.

The metal oxide-polymer composite particles should have sufficient mechanical strength to be mixed with toner particles according to methods typically used by those of skill in the art, for example, through use of a Henschel mixer or other fluidizing mixer or blender. Preferably, the metal-oxide composite particles have sufficient strength to survive collisions between toner particles (having the metal oxide-polymer composite particles distributed over the surface) during the development cycle of an electrophotographic process. The mechanical strength of the particles may be evaluated by formulating a chemical toner with the composite particles. The toner/particle formulation is then mixed with a carrier, e.g., silicone coated Cu—Zn ferrite carrier (30-90 μm particle size) to form a mixture with 2% (w/w) of toner. This mixture is then placed in a mixing container with a fill factor from about 70% to about 90% and tumbled in an agitator that can move the mixing container in a rhythmic, three-dimensional motion, termed a three-dimensional mixer. The mixing container is moved at a frequency from about 50 to about 70 cycles/min within a volume from about 6 to about 8 times the volume of the container. Exemplary agitators include the Turbula mixer, available from Willy A. Bachoven AG, the Inversina mixer, available from Bioengineering AG, and the dynaMix 3-dimensional mixer from Glen Mills. After a specified period of time, the samples are analyzed by SEM. If the composite particles have sufficient mechanical strength, they will not be flattened or deformed during the mixing. Any flattening or deformation will appear as a change in particle diameter in the SEM. In a preferred embodiment, the change in diameter of the metal oxide-polymer composite particles after 10 minutes of mixing is less than 25%, preferably less than 20%, for example, less than 10%.

Alternatively or in addition, the metal oxide-polymer composite particles may be used as a cleaning aid. The function and method of use of cleaning aids is discussed in U.S. Pat. No. 6,311,037, the contents of which are incorporated herein by reference. Briefly, a resilient blade removes excess toner from the photoreceptor after an image is printed. Abrasive particles can facilitate more complete removal of the excess toner, which otherwise might transfer to subsequent copies, creating a "shadow" effect in which a faint image of a previous copy appears on one or more subsequent copies. In general, two different kinds of particles are currently used as cleaning aids. Pulverized or precipitated inorganic particles (e.g., metal oxides, nitrides, carbides) have appropriate hardness and shape for the abrasive cleaning application. However, they have a wide particle size distribution. Larger particles can scratch the surface of the photoreceptor and smaller particles may be smaller than the clearance between the cleaning blade and the photoreceptor. Colloidal silica has a uniform particle size but, because of its smooth surface, has limited cleaning ability. The metal oxide-polymer composite particles combine the advantages of both of these particles—they have an irregular surface punctuated by hard, abrasive metal oxide particles but also have a narrow particle size distribution. The metal oxide-polymer composite particles for use as a cleaning aid may be incorporated in the toner formulation or may be contained in a separate reservoir from which they are delivered to a drum of the photocopier in the vicinity of the cleaning blade.

The metal oxide-polymer composite particles are preferably in the form of a powder. Preferably, they exhibit a low moisture content after equilibration at 50% relative humidity and 25° C. at about 1 atm pressure, for example, less than about 10% moisture by weight, for example, from about 0% to about 3%, from about 1% to about 4%, from about 3% to about 5%, from about 5% to about 7%, or from about 7% to about 10% moisture. Moisture content may be measured by drying 100 mg samples in a glass vial in an oven at 125° C. for 30 min, discharging them (e.g., by briefly holding them under the Haug One-Point-Ionizer (Haug North America, Williamsville, NY)), and then loading the samples into an instrument that will measure the mass of the samples after incubation for 20 min at selected relative humidity values between 0 and 95%.

The metal oxide-polymer composite particle powder may be milled or ground or may be classified as described in JP2018036596, for example, by sieving, filtering, air classifying, or other methods known to those of skill in the art. The degree of aggregation of the metal oxide-polymer composite particle powder may be less than 70%, for example, less than 60%, for example, from 10% to 70%, from 20% to 60%, from 30% to 50%, or from 25% to 40%. The degree of aggregation may be measured in a Hosokawa PT-X powder tester fitted with a Digiviblo Model 1332A digital display type vibrometer (Showa Sokki Co., Ltd). Sieves with openings of 38 μm (400 mesh), 75 μm (200 mesh) and 150 μm (100 mesh) are sequentially stacked from the bottom on the vibrating table of the powder tester. The measurement is carried out at 23° C. and 60% relative humidity (RH). The vibration width of the vibrating table is adjusted in advance so that the displacement value of the digital display type vibration meter is 0.60 mm (peak-to-peak). The metal oxide-polymer composite particles are allowed to equilibrate at 23° C. and 60% RH for 24 hours, following which 5.0 g is weighed out into the 150 μm sieve at the uppermost stage of the powder tester. The sieve is vibrated for 30 seconds, and then the mass of the composite particles remaining on each sieve is measured to calculate the degree of aggregation based on the following equation. Degree of aggregation (%)={(sample mass on sieve with 150 μm openings (g))/5 (g)}×100+{(sample mass on sieve with 75 μm openings (g))/5 (g)}×100×0.6+{(sample mass on sieve of 38 μm mesh (g))/5 (g)}×100×0.2.

The metal oxide-polymer composite particles may be combined with toner particles to form a toner. Conventional toners can be prepared by a number of known methods, such as admixing and heating a resin, pigment particles, optional charge enhancing additives and other additives in conventional melt extrusion devices and related equipment. Conventional equipment for dry blending of powders may be used for mixing or blending the carbon black particles with the resin. Other methods include spray drying and the like. Compounding of the pigment and other ingredients with the resin is generally followed by mechanical attrition and classification to provide toner particles having a desired particle size and particle size distribution. Chemical toners, also known as chemically prepared toners, are produced in a liquid phase; the resin particles are generally formed in the presence of the colorant. For example, a process has been developed in which polymer latex is combined with aqueous pigment dispersion and agglomerated using a coagulant to form polymer particles. Another process involves the aqueous suspension polymerization of a dispersion of pigment in at least one monomer. Also, a pigment/polyester resin dispersion has been prepared and combined with water, followed by evaporation of the solvent.

The metal oxide-polymer composite particles may provide a variety of benefits to a toner in which they are employed as an external additive. For example, they may complement the performance of other external additives with which they are used in combination, e.g., fumed or sol-gel (colloidal) silica, titania, mixed metal oxides such as but not limited to strontium titanate and strontium zirconate, waxes, fatty acid salts, polymer particles, and other materials that are typically used to enhance free flow and tribocharge performance of the final toner product.

The present invention will be further clarified by the following examples which are intended to be only exemplary in nature

EXAMPLES

To prepare samples for TEM, the particles in aqueous dispersions were diluted with ethanol and sonicated with a probe sonicator for 10 minutes. Sufficient dilution and dispersion are needed to ensure each individual particle is well separated from neighboring particles. The suspensions were dropped onto 200-mesh carbon-coated copper grids for TEM analysis. TEM images were acquired on a JEOL JEM-1200 EX Microscope at an accelerating voltage of 80 kV. The image resolution was typically set at 2 nm/pixel with image size of 2048 pixel×2048 pixel. Any uneven background of the images, if present, was first corrected using the ImageJ software available from the National Institutes of Health, then the image noise was reduced and contrast enhanced with appropriate digital filters. The images were subsequently segmented into binary images with separated images of each individual particle. The size and shape of each particle was determined using the ImageJ particle analyzer, then combined to generate distributions of size and shape of all particles in the sample, excluding aggregates comprising more than one primary composite particle. The values of SF-1, particle roughness, and RTA provided for composite particles below are averages from measurements of at least 500 particles; values for colloidal silica are averages from measurements of at least 100 particles.

To prepare samples for disc centrifuge photosedimentometry, a 0.05 wt % dispersion of composite particles was prepared in reverse osmosis treated water containing 0.05 wt % Triton X-100 surfactant in a 15 mL glass vial. This was agitated for 20 min using a SMT UH-50 homogenizer with a 50 watt output at 90% power, using a 3 mm by 136 mm titanium tip disposed 0.5 mm from the bottom of the vial.

To combine toner with the composite particles, an IKA M 20 Universal mill was used to mix silica-polymer composite particles with black polyester chemical toner with particle size about 8 micron from Sinonar Corp. in amounts to achieve 30% surface coverage. To prevent the toner from overheating and melting, mixing was performed in three 15 s pulses followed by 15 s cooling intervals.

The toner surface coverage C was calculated using the following relationship:

$$C=[w/(100\%-w)]\times[\rho_t \times d_t]/(\pi \times \rho_a \times d_a)\times[(\sqrt{3})/2]$$

where w is wt % of additive and $\rho_t$, $d_t$, $\rho_a$, $d_a$ are the density ($\rho$) and diameter (d) of the toner and additive particles, respectively. Additive particle size was determined by disk centrifuge photosedimentometry (CPS) and additive density was measured by the helium pycnometry method. The toner density was assumed to be 1.2 g/cm$^3$ and the particle size 8 microns.

Developers were prepared by mixing 2 parts by weight formulated toner with 98 parts Cu—Zn ferrite carrier coated with a silicone resin (carrier particle size 60-90 microns from Powdertech Co. Ltd.). The developers were conditioned for several hours at 30° C. and 80% relative humidity, which corresponds to HH (high temperature/high humidity) conditions, or at 18° C. and 20% RH, which corresponds to LL (low temperature/low humidity). After conditioning, the triboelectrostatic charge was developed by rolling the jars containing the developers on a roll mill for 30 min at 185 rpm. The triboelectric charge was measured using a Vertex T-150 tester from Vertex Image Products, Inc. 1 g of charged developer was placed in a Faraday cage. The toner blow off from the carrier was performed for 1 min using an approximately 20 psi air jet. The electrostatic charge on the toner remaining in the Faraday cage carrier was measured by the built-in electrometer in the Vertex tester and the mass of blown off toner determined as the difference between the weights of the Faraday cage before and after blow off.

Toner cohesion was measured using a Hosokawa PT-X powder tester. 2 g of toner mixed with an additive was placed on an upper sieve of a stack of three sieves (75, 45 and 25 micron openings) and the sieves were allowed to vibrate for 20 seconds with an amplitude of 1.0 mm and frequency of 50-60 Hz. The cohesion was calculated according to the formula: Cohesion %=(M$_t$/M$_{init}$) (M$_m$/M$_{init}$)*0.6 (M$_b$/M$_{init}$)*0.2*100%, where M$_t$, M$_m$, and M$_b$ are the weights of toner remaining on the top, middle, and bottom sieves, respectively, when the vibration stopped and M$_{init}$ is the weight of the initial sample.

Example 1: Synthesis of Composite Particles Using Snowtex O40 (ST-O40) and Snowtex O(ST-O) Mixture This example illustrates the gradual decrease of composite particle size as larger ST-O40 colloidal silica is replaced with the smaller ST-O colloidal silica. For Example 1A, a 3000 mL four neck round bottom flask equipped with an overhead stirring motor, condenser and thermocouple is charged with 909 mL of DI water, 257 g of ST-O40 silica dispersion in water (manufactured by Nissan Chemical; ~22 nm particle size, pH~4.0, concentration~41 wt %), and 4.56 g of 5 M aqueous solution of ammonium hydroxide. The dispersion is agitated for ~5 min and 131 g of 3-methacryloxypropyltrimethoxy silane (MPS, CAS #2530-85-0, Mw=248.3) is added. The temperature is raised to 50° C. and the mixture stirred at 200 rpm for 3 hours. 2,2'-azobisisobutyronitrile (further abbreviated as AIBN, CAS #78-67-1, Mw=164.2) is added and temperature raised to 80° C. over 30 min. After 90 min at 80° C. the reaction mixture is cooled down to 65° C. and filtered through a 200-mesh screen to remove pieces of coagulum. 23 g of 1,1,1,3,3,3-hexamethyldisilazane (HMDZ) is added to the mixture and the reaction continued for another 5-8 h at 65° C. after which the reaction mixture is transferred to a Pyrex tray and dried overnight at 120° C.

Figure 2A:
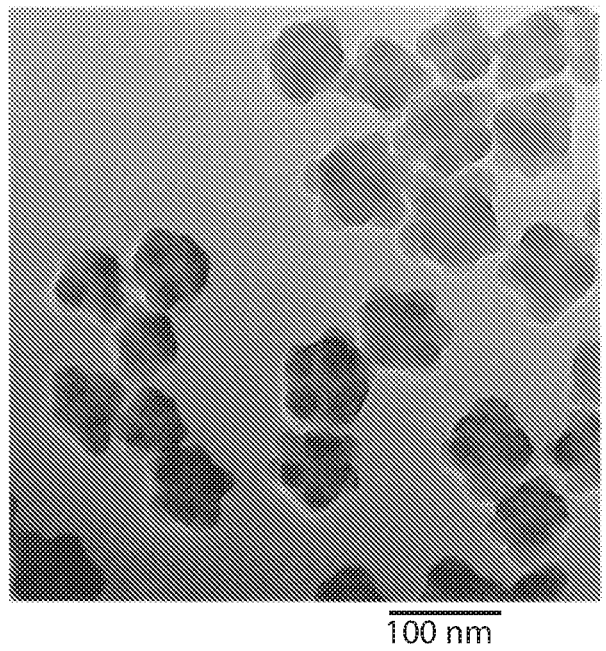
FIGS. 2-6 are transmission electron micrographs of metal oxide-polymer composite particles produced according to various embodiments of the invention.
Figure 2B:
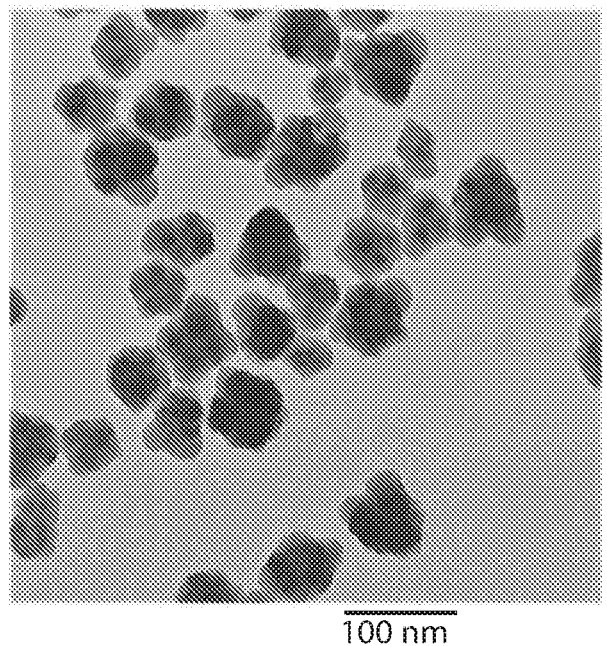

Examples 1B-1D are prepared following the same procedure as described for Example 1A. The only difference is that mixtures of ST-O40 and ST-O (12 nm diameter, Nissan Chemical) silicas are used (silicas are added to the reaction flask one after another). Table 1 below contains information about the amounts of chemicals to be used. This method may be used to prepare particles having the median particle sizes (measured by disk centrifuge photosedimentometry) listed in the table below. The change in size need not change the particle roughness or RTA dramatically. For example, the process of Example 1A may be used to prepare particles having average SF-1 of 141-146, average particle roughness of 1.29-1.32 and average RTA of 0.092 to 0.097. The process of Example 1B may be used to prepare particles having average SF-1 of 147-152, average particle roughness of 1.27-1.30, and average RTA of 0.090-0.096. FIGS. 2A and 2B illustrate how the respective compositions in Examples 1A and 1B listed below may be used to produce particles in which both types of silica particles have been incorporated.

TABLE 1

| Example | DI water (g) | ST-O (g, 20 wt % disp.) | ST-O40 (g, 40 wt % disp.) | ST-O/ ST-O40 (w/w) | NH$_4$OH (5M) (g) | MPS (g) | AIBN (g) | D50 (nm) |
|---|---|---|---|---|---|---|---|---|
| 1A | 909 | 0 | 257 | 0/100 | 4.56 | 131 | 0.65 | 77-92 |
| 1B | 291 | 55 | 64 | 30/70 | 1.56 | 46 | 0.23 | 56-71 |
| 1C | 274 | 92 | 46 | 50/50 | 1.56 | 46 | 0.23 | 48-63 |
| 1D | 254 | 129 | 28 | 70/30 | 1.56 | 46 | 0.23 | 45-60 |

Figure 3A:
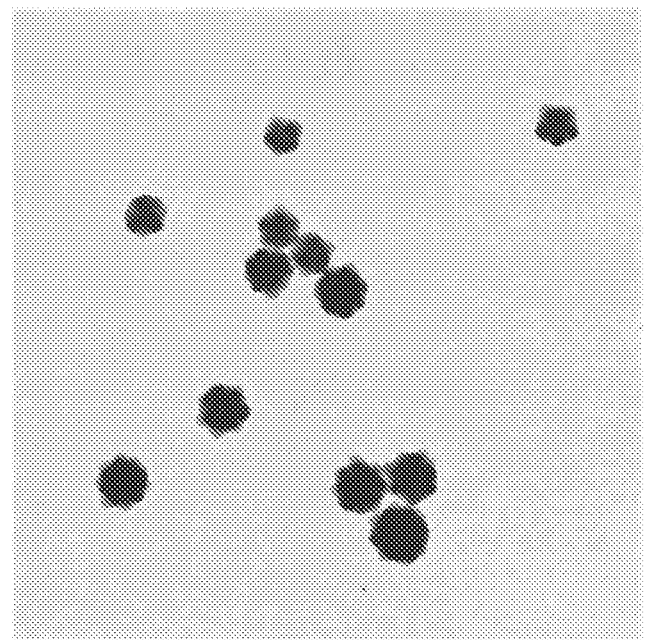
Figure 3B:
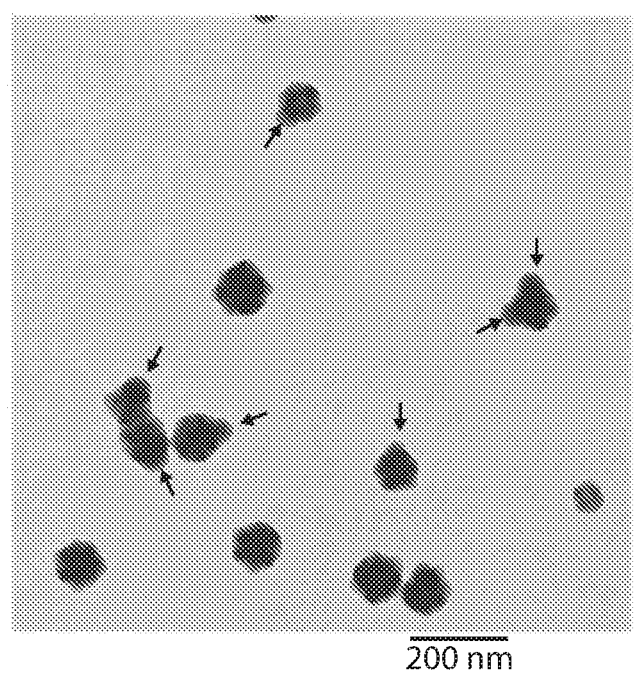
Figure 3C:
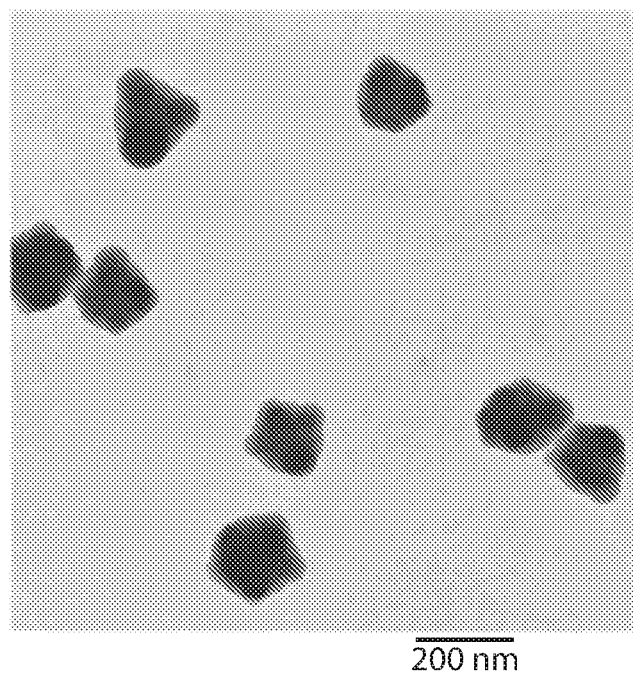

Example 2: Synthesis of Composite Particles Using Snowtex O40 (ST-O40) and ST-O40 and ST-OL Mixture This example demonstrates the increase in composite particle size as the smaller colloidal silica ST-O40 is replaced with the larger ST-OL silica. The method in Example 1 may be used with the amounts of reagent amounts in Table 2 below to produce particles having the median particle size listed. FIGS. 3A-3C illustrate how the respective compositions in Examples 2A-2C listed below may be used to produce particles in which both types of silica particles have been incorporated. The arrows in FIG. 3B point to the ST-OL particles. The process of Example 2A may be used to prepare particles having average SF-1 of 128-134, average particle roughness of 1.24-1.29 and average RTA of 0.068 to 0.077. The process of Example 2B may be used to prepare particles having average SF-1 of 132-139, average particle roughness of 1.23-1.28, and average RTA of 0.063-0.073. The process of Example 2C may be used to prepare particles having average SF-1 of 140-144, average particle roughness of 1.27-1.31, and average RTA of 0.057-0.067.

TABLE 2

| Example | DI water (g) | ST-O40 (g, 40 wt % disp.) | ST-OL (g, 20 wt % disp.) | ST-O40/ ST-OL (w/w) | $NH_4OH$ (g, 5M) | MPS (g) | AIBN (g) | D50 (nm) |
|---|---|---|---|---|---|---|---|---|
| 2A | 1433 | 236 | 0 | 100/0 | 2.4 | 284 | 2.8 | 105-130 |
| 2B | 1386 | 189 | 94 | 80/20 | 2.4 | 284 | 2.8 | 120-145 |
| 2C | 1209 | 0 | 472 | 0/100 | 3.6 | 284 | 2.8 | 145-165 |

Figure 4A:
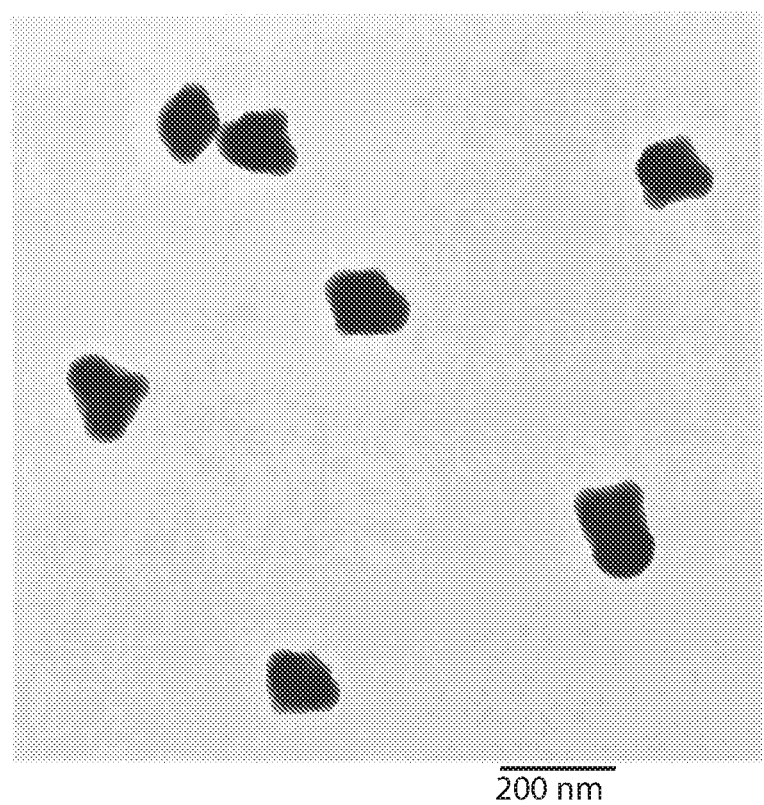
Figure 4B:
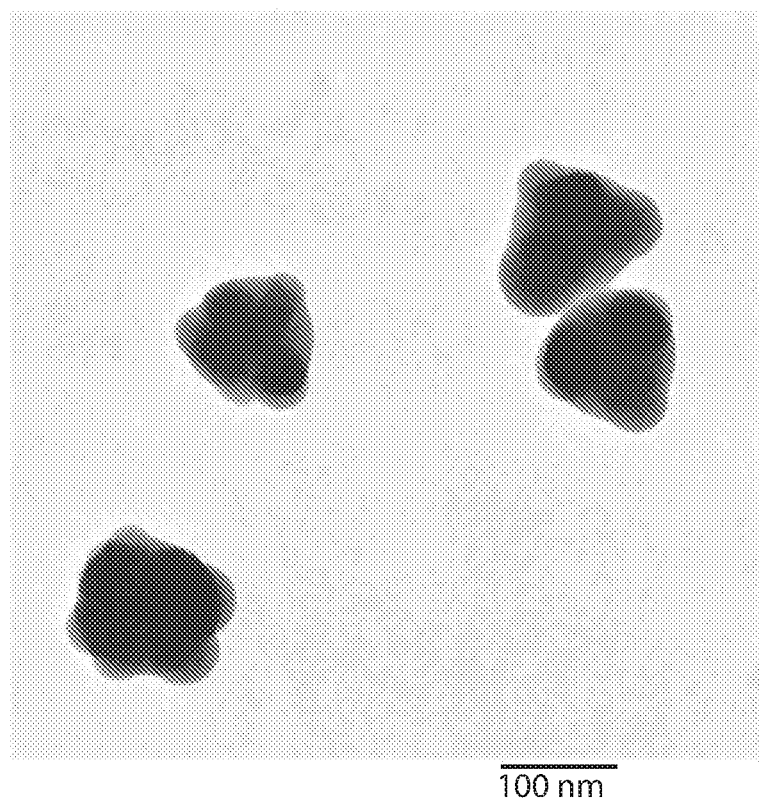

Example 3: Synthesis of Composite Particles with Irregular Shape and Relatively Smooth Surface The process of Example 1 may be used with ST-OL silica (45-50 nm particle size) in place of the silicas listed in Example 1 and a monomer-silica ratio of 1.4 to produce particles such as those shown in FIGS. 4A and 4B, with a median particle size D50 of 125-150 nm. The process of Example 3 may be used to prepare particles having average SF-1 of 131-152, average particle roughness of 1.21-1.36 and average RTA of 0.045 to 0.079.

Figure 5A:
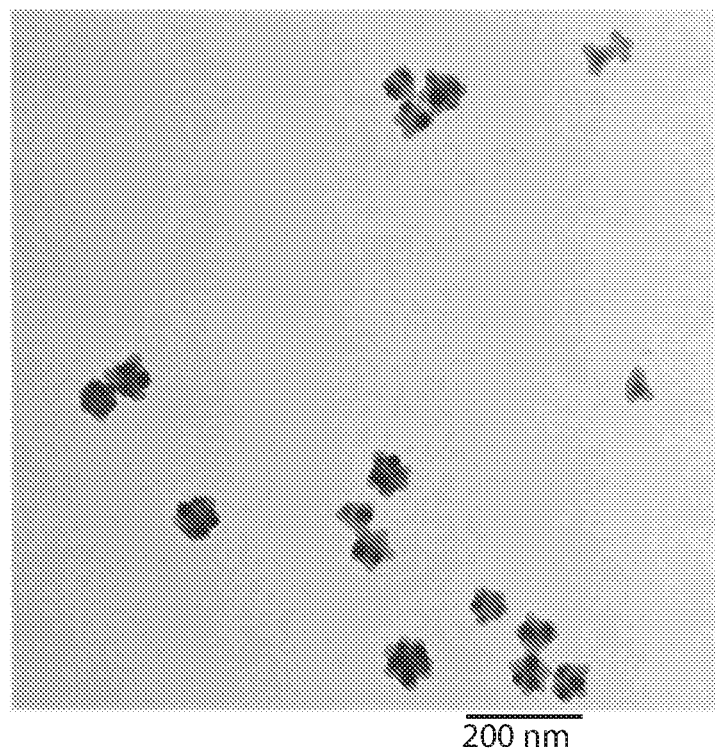
Figure 5B:
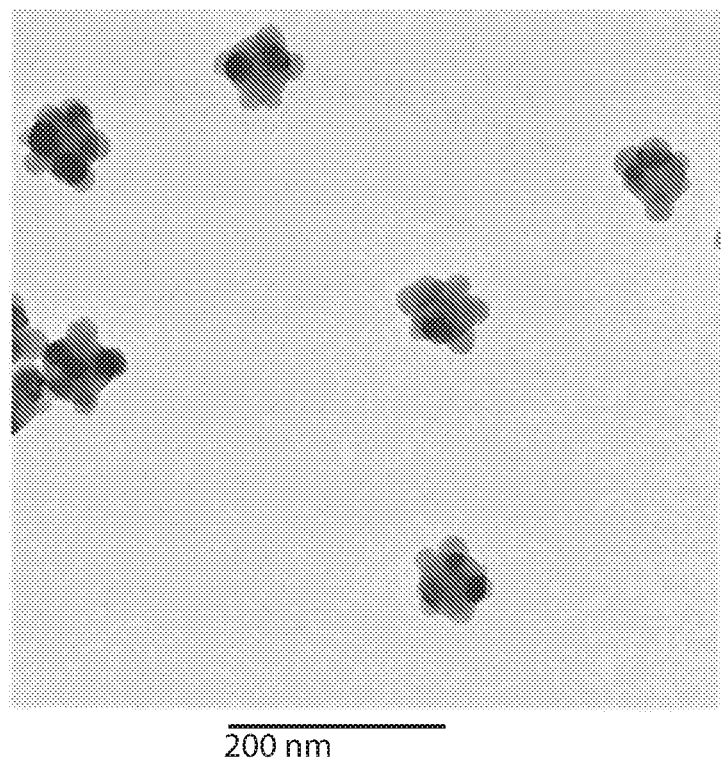

Example 4: Synthesis of Composite Particles with Irregular Shape and High Surface Roughness The process of Example 1, except without the addition of ammonium hydroxide may be used with Ludox AS-40 silica (WR Grace, 22 nm particle size, 40% solids in dispersion) in place of the silicas listed in Example 1, a monomer-silica ratio of 2, and a solids concentration of 5.4% in the reaction mixture to produce particles such as those shown in FIGS. 5A and 5B. The process of this Example may be used to prepare particles having average SF-1 of 144-162, average particle roughness of 1.49-1.65 and average RTA of 0.108 to 0.142.

Figure 6A:
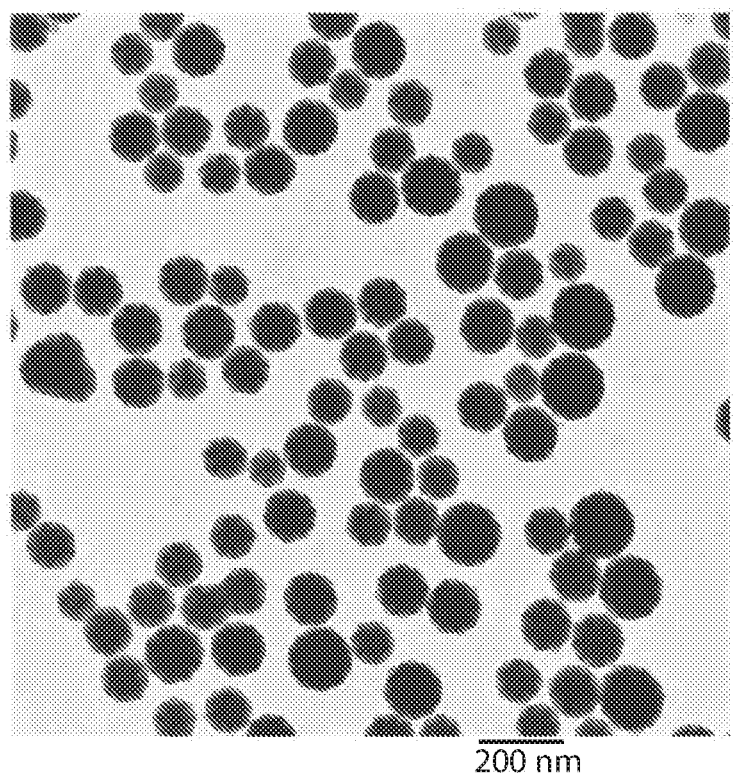
Figure 6B:
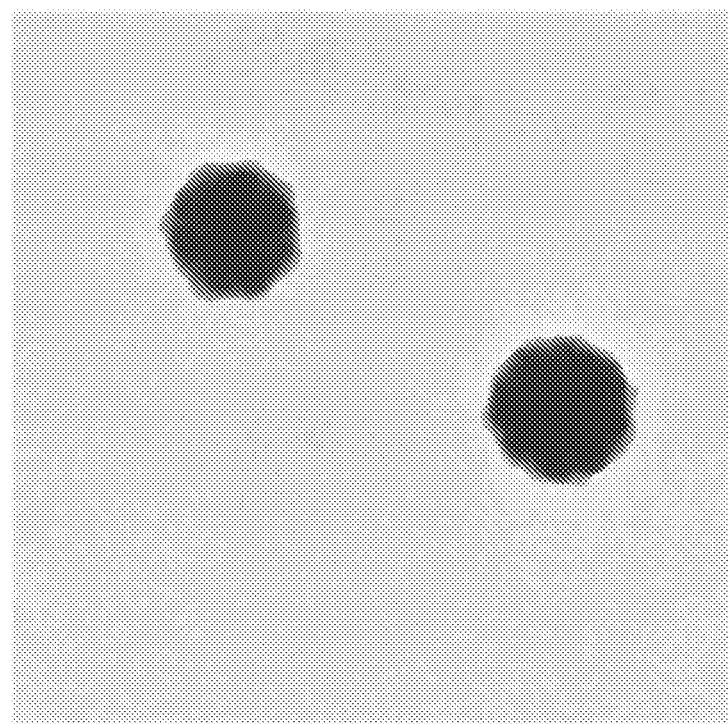

Example 5: Synthesis of Composite Particles with Spherical Shape and Varied Surface Roughness A) The process of Example 1 may be used with ST-O40 silica and a monomer-silica ratio of 3 to produce particles such as those shown in FIGS. 6A and 6B, with a median particle size D50 of 115-140 nm. The process of this Example may be used to prepare particles having average SF-1 of 116-119, average particle roughness of 1.19-1.22 and average RTA of 0.038 to 0.042.

Figure 6C:
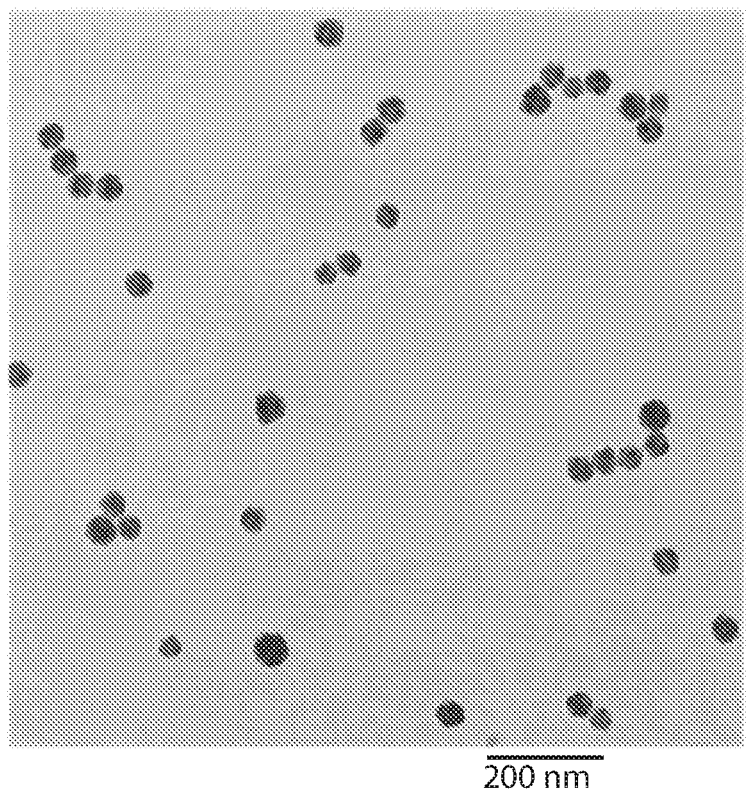
Figure 6D:
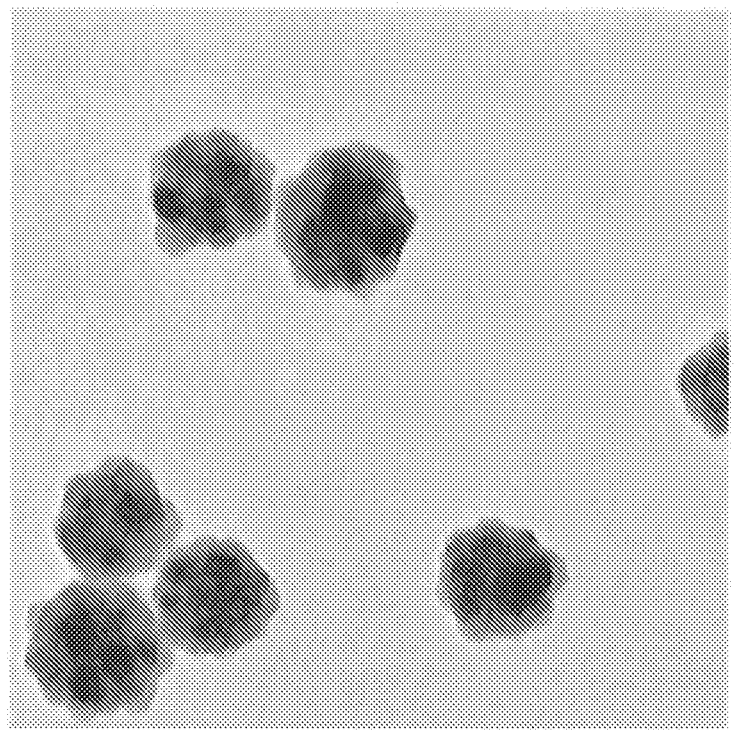

B) The process of Example 1 may be used with ST-O silica and a monomer-silica ratio of 1.25 to produce particles such as shown in FIGS. 6C and 6D, with a median particle size D50 of 45-70 nm but a much higher surface roughness than those of Example 5A. Amounts of reagents that may be used to produce the particles of both Examples 5A and 5B are listed in Table 3 below. The process of this Example may be used to prepare particles having average SF-1 of 135-140, average particle roughness of 1.22-1.25 and average RTA of 0.079 to 0.086.

TABLE 3

| Sample | DI water (g) | ST-O40 (g, 40 wt % disp.) | ST-O (g, 20 wt % disp.) | $NH_4OH$ (5M) | MPS (g) | AIBN (g) | HMDZ (g) |
|---|---|---|---|---|---|---|---|
| 5A | 1446 | 236 | 0 | 2.37 | 284 | 1.80 | 35 |
| 5B | 482 | 0 | 787 | 1.80 | 197 | 1.96 | 34 |

Example 6—Comparative Example 1

Figure 7:
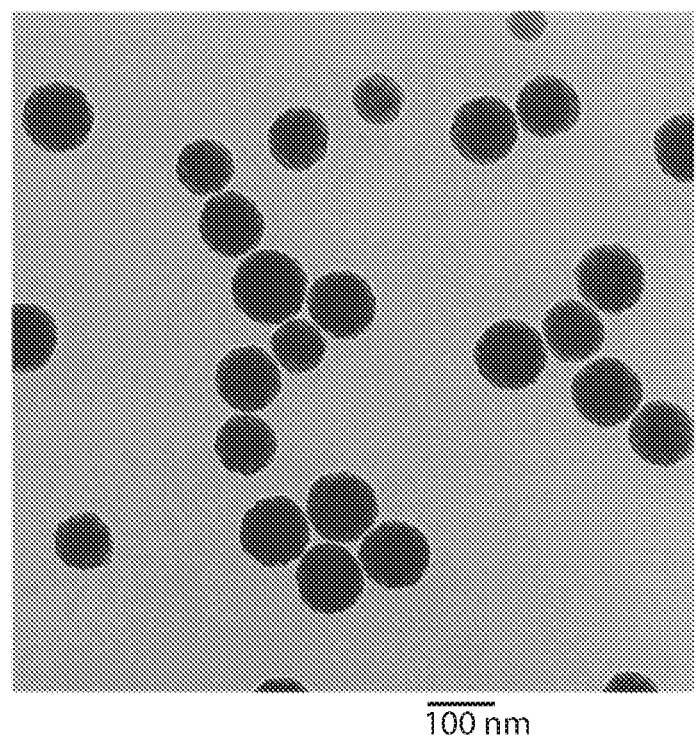
FIG. 7 is a transmission electron micrograph of colloidal silica.

TEM images of spherical colloidal silica, i.e. MP-1040 colloidal silica, (Nissan Chemical Inc.), with a smooth particle surface were collected and parameters describing particle shape were measured (FIG. 7). average SF-1 was 113, average particle roughness was 1.15, and the average RTA was 0.030.

Example 7

This example illustrates the use of alkylsilanes as monofunctional components in conjunction with the bifunctional component of the first hydrophobizing system to increase the tribocharge of silica-polymer composite particles. For Examples 7A and B, a solution of 19 g of ST-O40 silica in 68 g deionized water is stirred at room temperature, following which 0.19 g of 5N ammonium hydroxide is added to bring the pH to about 9.3. A mixture of either a) 4.9 g n-propyltrimethoxysilane (NPTMS) or b) phenyltrimethoxysilane (PTMS) with 4.9 g MPS is added all at once. The temperature is then ramped to 40° C. over one hour and maintained at the same temperature for 1.5 hours. Next, 0.1 g AIBN is added and the temperature ramped to 80° C. and held for 1.5 hours. The reaction mixture is cooled to 65° C., following which 2.5 g hexamethyldisilazane is added and the mixture incubated at 65° C. for 3 hours. The resulting precipitate is filtered by suction, washed with deionized water, and dried under vacuum. The resulting cake is dried in an oven at 120° C. for several hours and then milled in an IKA mill.

For Example 7C, a solution of 45 g of ST-O40 silica in 160 g deionized water is stirred at room temperature, following which 0.48 g of 5N ammonium hydroxide is added to bring the pH to about 9.3. A mixture of 11.5 g diisopropyldimethoxysilane (DIPDMS) with 11.5 g MPS is added all at once. The temperature is then ramped to 40° C. over 1.5 hours and maintained at the same temperature for 2 hours. The temperature is then ramped to 60° C. and the mixture incubated for 45 minutes. Next, 0.5 g AIBN is added and the temperature ramped to 75° C. and held for 2 hours. The reaction mixture is cooled to 65° C., following which 4.3 g hexamethyldisilazane is added and the mixture incubated at 65° C. for 6 hours. The resulting precipitate is filtered by suction, washed with deionized water, and dried under vacuum. The resulting cake is dried in an oven at 120° C. for several hours and then milled in an IKA mill.

These methods may be used to make samples such as those in Table 4 below, which were formulated into toner with 30% coverage. The column "Hydrophobicity" indicates that the sample would not be wetted in a methanol-water solution with a methanol concentration below the indicated percentage; i.e., the material would float on the surface. In contrast, the process of Example 1A may be used to make composite particles that may be used to make toner having a tribocharge at LL conditions of −52 to −50 and −22.5 to −21.5 at HH conditions. The results show that the use of alkylsilanes in addition to MPS increases the tribocharge, while the use of the aromatic phenylsilane does not noticeably increase tribocharge.

TABLE 4

| Silane type | LL | HH | Hydrophobicity |
|---|---|---|---|
| Phenyltrimethoxysilane | −52.5--51.0 | −23.8--18.9 | 30% |
| Diisopropyldimethoxysilane | −73.5--69.2 | −29.7--28.5 | 20% |
| n-Propyltrimethoxysilane | −58.0--57.0 | −25.0--23.6 | 40% |

Example 8—Increasing Particle Roughness

The method of Example 1, except without the addition of ammonium hydroxide, may be used with Ludox AS-30 silica (WR Grace, 12 nm, 30% solids loading in dispersion) and Ludox AS-40 silica, with the amount of silica dispersion and water adjusted to maintain the solids loading and monomer-silica ratio, to produce metal oxide—polymer composite particles having the characteristics below (Table 5). The Ludox silica is stabilized with ammonium hydroxide, raising the pH of the reaction mixture and increasing the roughness of the resulting composite particle.

TABLE 5

| Example | Silica type | D50 (nm) | RTA | Roughness |
|---|---|---|---|---|
| 8A | AS-30 | 62-66 | 0.105-0.115 | 1.33-1.36 |
| 8B | AS-40 | 106-110 | 0.095-0.105 | 1.33-1.36 |

Example 9—Positively Charged Composite Particles

Particles having the properties described in Examples 1A and 5B were further treated with a cyclic silazane. 300 g of the composite particle powder was put in a 1 gallon Nalgene bottle and sprayed with a mixture of 4.3 g or 5.5 g respectively of a cyclic silazane having the formula

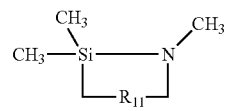

where $R_{11}$ is —$(CH_2CH(CH_3)CH_2)$— and 10 mL of 2-propanol. The bottle was tightly closed and rolled on a roll mill for 1 hour at about 90 rpm. The sealed bottle was left overnight at room temperature, following which the powder was transferred to a Pyrex tray and de-ammoniated for 3-4 hours in a dry air oven at 120° C. The use of the cyclic silazane treatment leaves an amine group attached to the particle surface and allows these composite particles to take on positive tribocharge without changing the particle morphology.

Example 10—Comparative Examples

ST-XL and ST-YL silicas (surface areas 60 $m^2$ and 45 $m^2$, respectively, Nissan Chemicals, Inc.) were treated with HMDZ as described in U.S. Pat. No. 7,811,540 to produce hydrophobically treated particles with approximately 10 molecules of HMDZ per 1 $nm^2$ of silica surface. The same silicas were treated with HMDZ and the cyclic silazane described in Example 9 as described in U.S. Pat. No. 8,455,165 to produce hydrophobically treated particles with 5-10 molecules of HMDZ and about 1.6 molecules of the cyclic silazane per 1 $nm^2$ of silica surface. The resulting powders were milled in an IKA A11 laboratory mill (IKA Corporation) prior to use in Example 11.

Example 11—Cohesion Measurements

Particles having the morphologies and compositions described in Examples 1A, 2A, 2C, 4, 5B, 8A, 8B, and 9, the particles of Example 10, and CAB-O-SIL TG-C110 colloidal silica (HMDZ treated silica with a particle size of 115 nm, SF-1 of 111, average particle roughness of 1.23 and average RTA of 0.0256) were fabricated in toner as described above with coverage amounts selected from 15%, 30-32%, and 45%. Toner cohesion was measured in triplicate.

The JMP software package (version 12.0.1, SAS Institute, Inc.) was used for statistical analysis of the collected data. A linear regression model was used. In the regression model, toner cohesion was a dependent variable and toner surface coverage, additive particle size, and additive morphology described as RTA were independent variables. The model included intercept, linear terms with respect to toner coverage and particle size and a quadratic term in RTA. Only statistically significant terms were included with p-value less than 0.05. The model did not show a relationship between surface treatment (i.e. HMDZ/cyclic vs. HMDZ alone) and toner cohesion. There were 100 observations used in the model. The $R^2$ was 81.4% and significance in the F-test was <0.0001.

Figure 8A:
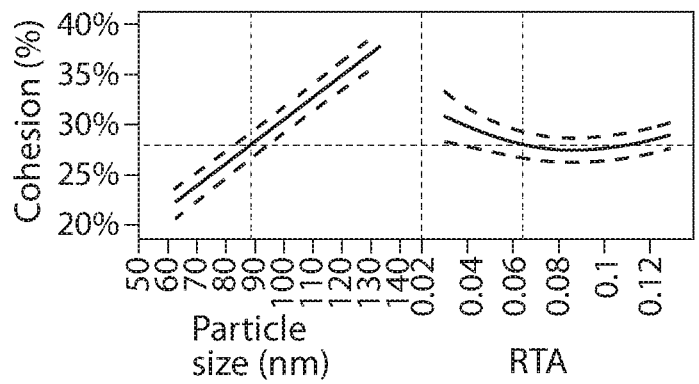
FIG. 8 is a set of graphs resulting from statistical modeling of cohesion with respect to particle size and additive average RTA at 15% (A), 30% (B), and 45% (C) additive coverage on model toner.
Figure 8B:
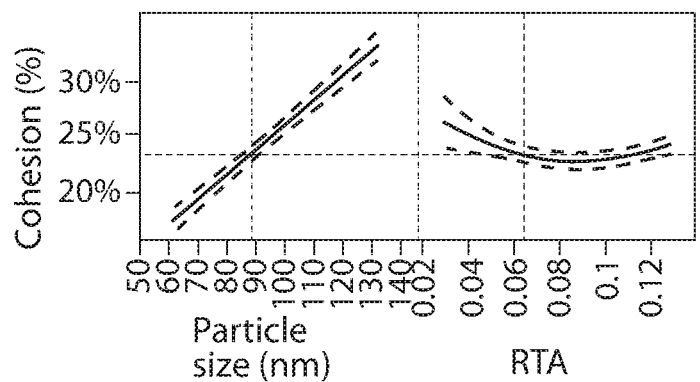
Figure 8C:
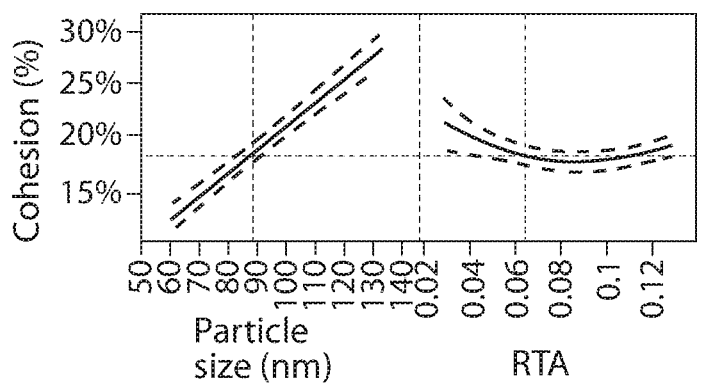
Figure 9:
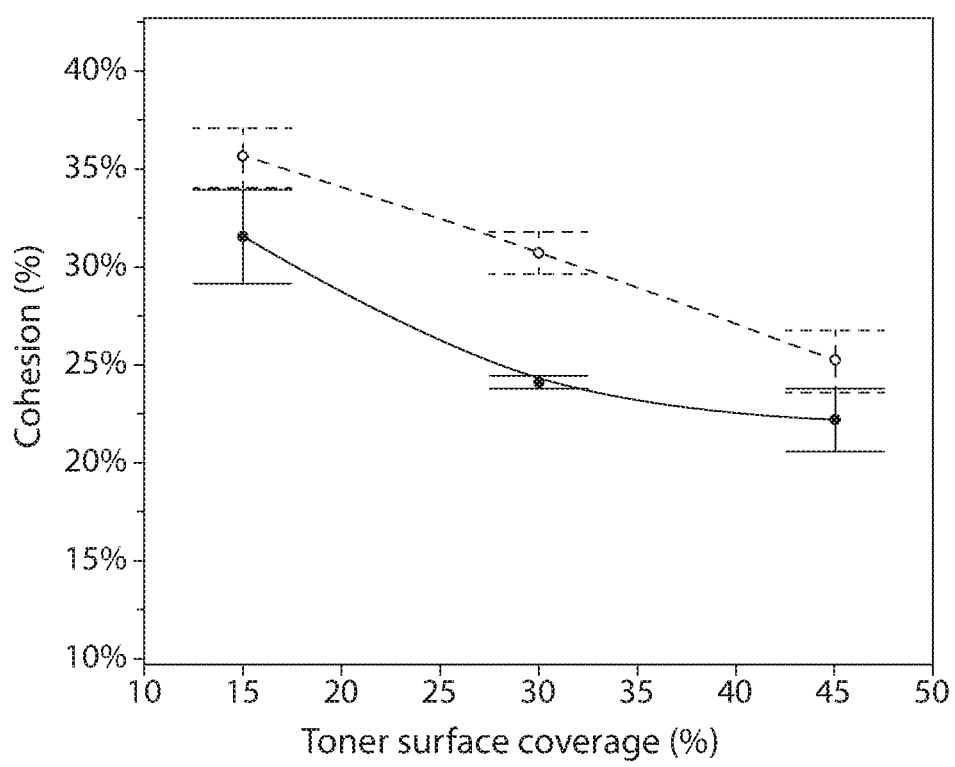
FIG. 9 is a graph showing the variation of cohesion with surface coverage for composite particles having different RTA.

The linear regression model was used to generate a response surface of toner cohesion as a function of additive particle size and RTA at toner surface coverages of 15, 30, and 45% (FIG. 8; the solid curve is the function generated by the model; the dotted lines on either side indicate the confidence limits). The response surfaces show that the lowest cohesion should be expected when model toner is mixed with additives with RTA in the range between 0.060 and 0.120. The results show that cohesion increases with increasing particle size and decreasing surface coverage. FIG. 9 shows the plot of cohesion with respect to surface coverage for toners produced with composite particles with the properties described in Example 2A (dotted line) and Example 8B (solid line). The average RTA of samples produced according to Example 8B is higher than for Example 2A, demonstrating that increasing RTA decreases cohesion and increases free flow.

The foregoing description of preferred embodiments of the present invention has been presented for the purposes of illustration and description. It is not intended to be exhaustive or to limit the invention to the precise form disclosed. Modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. Silica-polymer composite particles in powder form comprising a plurality of silica particles and a polymer matrix, wherein:
the plurality of silica particles comprises at least a first population of silica particles and a second population of silica particles, the first population of silica particles having a different size, shape, or particle size distribution with respect to the second population;
the silica particles are surface-modified with a first hydrophobizing system comprising a bifunctional component via which the silica particles are covalently attached to the polymer matrix,
at least a portion of the plurality of silica particles project into and out from the polymer matrix,
the polymer matrix comprises a polymer or copolymer of the first hydrophobizing system, and
the silica-polymer composite particles have an average SF-1 from 110 to 185 and an average RTA from 0.06 to 0.19.

2. The composite particles of claim 1, wherein the first hydrophobizing system further comprises a monofunctional component having the formula $(OR^1)_{4-z}SiR^4_z$, where $R^1$ is methyl or ethyl, z is 1 or 2, and $R^4$ is a branched or unbranched C1-C10 alkyl group or $R^2Ph$, where Ph is an unsubstituted phenyl group or a phenyl group substituted with C1-C10 branched or unbranched alkyl, halogen, C1-C10 alkylether, methoxy, ethoxy, or hydroxy.

3. The composite particles of claim 1, wherein the median particle sizes D50 of the first population and the second population have a ratio of about 40:1 to about 1.5:1.

4. The composite particles of claim 1, wherein the ratios D75/D25 for the first population and the second population have a ratio of about 40:1 to about 1.1:1.

5. The composite particles of claim 1, wherein the mass ratio of the first population and the second population is from about 1:20 to about 20:1.

6. The composite particles of claim 1, wherein the silica-polymer composite particles have a volume average particle size of about 20 nm to about 1000 nm.

7. The composite particles of claim 1, wherein the silica-polymer composite particles have an average roughness $P^2/4\pi S$ from about 1.22 to about 1.9.

8. The composite particles of claim 1, wherein the polymer matrix comprises polymers of styrene, unsubstituted or substituted acrylates or methacrylates, olefins, vinyl esters, and acrylonitrile and copolymers and mixtures of the above.

9. The composite particles of claim 1, wherein at least a portion of the surface of the silica-polymer composite particle is modified with a second hydrophobizing agent.

10. A toner composition comprising the composite particles of claim 1 disposed on the surface of toner particles.

11. A method of producing a silica-polymer composite particle, comprising:
preparing an aqueous dispersion comprising a first hydrophobizing system in an aqueous medium and at least a first population of silica particles and a second population of silica particles, the first population of silica particles having a different size, shape, or particle size distribution than the second population, wherein the first hydrophobizing system comprises a bifunctional component having the formula $[R^3_{3-x}(OR^1)_x]SiR^2Q$, where x is 1, 2, or 3, $R^1$ is methyl or ethyl, $R^2$ is an alkyl linker with the general formula $C_nH_{2n}$, where n=1-10, $R^3$ is methyl or ethyl and Q is a substituted or unsubstituted vinyl, acrylate ester, or methacrylate ester group, with the proviso that when Q is substituted or unsubstituted vinyl, n is 2-10;
incubating the dispersion for a predetermined amount of time;
adding a radical initiator to the dispersion;
allowing a chemical group of the first hydrophobizing system to become part of a polymer, thereby forming silica-polymer composite particles having an average SF-1 from about 110 to about 185 and an average RTA from about 0.06 to about 0.19; and drying the silica-polymer composite particles to obtain a powder.

12. The method of claim 11, further comprising treating at least a portion of the silica particles with a second hydrophobizing agent, wherein treating may be performed before preparing or after formation of the silica-polymer composite particles.

13. The method of claim 11, wherein the first hydrophobizing system further comprises a monofunctional component having the formula $(OR^1)_{4-z}SiR^4_z$, where $R^1$ is methyl or ethyl, z is 1 or 2, and $R^4$ is a branched or unbranched C1-C10 alkyl group or $R^2Ph$, where Ph is an unsubstituted phenyl group or a phenyl group substituted with C1-C10 branched or unbranched alkyl, halogen, C1-C10 alkylether, methoxy, ethoxy, or hydroxy.

14. The method of claim 11, wherein D50 of the first population and the second population have a ratio of about 40:1 to 1.5:1.

15. The method of claim 11, wherein the ratios D75/D25 for the first population and the second population have a ratio of about 40:1 to about 1.1:1.

16. The method of claim 11, wherein the mass ratio of the first population and the second population is from about 1:20 to about 20:1.

17. The method of claim 11, wherein the emulsion further comprises one or more of styrene, a substituted or unsubstituted acrylate or methacrylate monomer, an olefin monomer, a vinyl ester, or acrylonitrile.

18. The method of claim 11, wherein the silica-polymer composite particles have a volume average particle size from about 20 nm to about 1000 nm.

19. The method of claim 11, wherein a specific density of the silica-polymer composite particles when measured by helium pycnometry is from about 30% to about 90% of the specific density of the silica.

20. The method of claim 11, wherein the silica-polymer composite particles have an average roughness $P^2/4\pi S$ from about 1.22 to about 1.9.

* * * * *